United States Patent
Shaool et al.

(10) Patent No.: US 9,736,521 B2
(45) Date of Patent: Aug. 15, 2017

(54) USING TIMED TRANSPORT STREAM FOR RECEIVER-SIDE INTER-DEVICE COMMUNICATION

(71) Applicant: QUALCOMM Incorporated, San Diego, CA (US)

(72) Inventors: Dafna Shaool, San Diego, CA (US); Nir Gerber, Haifa (IL); Liat Bonen, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/556,491

(22) Filed: Dec. 1, 2014

(65) Prior Publication Data
US 2015/0181273 A1 Jun. 25, 2015

Related U.S. Application Data

(60) Provisional application No. 61/920,386, filed on Dec. 23, 2013.

(51) Int. Cl.
*H04N 7/167* (2011.01)
*H04N 21/41* (2011.01)
(Continued)

(52) U.S. Cl.
CPC ........ *H04N 21/4104* (2013.01); *H04H 60/15* (2013.01); *H04N 21/4181* (2013.01);
(Continued)

(58) Field of Classification Search
USPC ...................................... 725/31, 25, 90, 118
See application file for complete search history.

(56) References Cited

U.S. PATENT DOCUMENTS 6,961,430 B1    11/2005   Gaske et al.
7,116,894 B1 *   10/2006   Chatterton ............. H04N 5/765
                                                                                                         348/512

(Continued)

FOREIGN PATENT DOCUMENTS

WO    2013048377 A1    4/2013

OTHER PUBLICATIONS

International Search Report and Written Opinion—PCT/US2014/071980—ISA/EPO—Apr. 8, 2015.

*Primary Examiner* — Jivka Rabovianski
(74) *Attorney, Agent, or Firm* — The Marbury Law Group, PLLC

(57) ABSTRACT

Systems, methods, devices, and non-transitory media of the various embodiments facilitate real time playback of a digital broadcast by enabling reduction of the amount of time a receiver device's low power mode interface with a separate computing device operates in an operational/high power mode. The receiver device may associate a stream of media packets of a digital broadcast with system time clock timestamps indicating when the media packets were received, and store the media packets in a temporary packet buffer. Periodically, a media packet burst stored in the temporary packet buffer may be sent to the separate computing device via a low power mode interface operating in an operational/high-power mode different than a low power mode. The low power mode interface may be returned to the low-power mode until the next burst of packets is sent to the separate computing device.

26 Claims, 12 Drawing Sheets

(51) Int. Cl.
  *H04N 21/8547* (2011.01)
  *H04N 21/43* (2011.01)
  *H04N 21/434* (2011.01)
  *H04N 21/418* (2011.01)
  *H04N 21/443* (2011.01)
  *H04N 21/4363* (2011.01)
  *H04N 21/44* (2011.01)
  *H04N 21/426* (2011.01)
  *H04N 21/61* (2011.01)
  *H04H 60/15* (2008.01)

(52) U.S. Cl.
  CPC ... *H04N 21/42623* (2013.01); *H04N 21/4305* (2013.01); *H04N 21/4343* (2013.01); *H04N 21/43632* (2013.01); *H04N 21/44004* (2013.01); *H04N 21/4436* (2013.01); *H04N 21/6143* (2013.01); *H04N 21/8547* (2013.01); *Y02B 60/50* (2013.01)

(56) References Cited

U.S. PATENT DOCUMENTS

| | | | |
|---|---|---|---|
| 7,372,873 | B1 | 5/2008 | Kumar et al. |
| 8,085,804 | B2 | 12/2011 | Perlman et al. |
| 8,098,973 | B2 | 1/2012 | Kelly et al. |
| 2004/0260823 | A1 | 12/2004 | Tiwari et al. |
| 2006/0123181 | A1* | 6/2006 | Aull ............ H04L 47/10 710/310 |
| 2008/0123732 | A1 | 5/2008 | Mamidwar et al. |
| 2008/0279375 | A1 | 11/2008 | Candelore et al. |
| 2012/0284757 | A1* | 11/2012 | Rajapakse ...... H04N 21/41407 725/81 |
| 2012/0321080 | A1 | 12/2012 | Candelore et al. |
| 2013/0013825 | A1 | 1/2013 | Muto |
| 2014/0153898 | A1* | 6/2014 | Ruster ............ G06F 1/3228 386/231 |

* cited by examiner

| USB Link State (USB version) | Description |
|---|---|
| U0 (USB 3.0) | High-power mode/full-operational power state |
| U1 (USB 3.0) | Low-power mode (fast physical layer recovery delay) |
| U2 (USB 3.0) | Low-power mode (medium physical layer recovery delay) |
| U3 (USB 3.0) | Low-power mode (slow physical layer recovery delay/suspend mode) |
| L0 (USB 2.0) | High-power mode/full-operational power state |
| L1 (USB 2.0) | Sleep power mode (Fast recovery—optional mode) |
| L2 (USB 2.0) | Suspend mode (long recovery) |
| L3 (USB 2.0) | Powered off, disconnected, or disabled mode |

FIG. 5B

| USB Version | From Link State | To Link State | Transition Time |
|---|---|---|---|
| 2.0 | L0 | L1 | 8–10 μs |
| 2.0 | L1 | L0 | 60 μs – 1.2 ms |
| 2.0 | L0 | L2 | > 3 ms |
| 2.0 | L2 | L0 | 10–30 ms |
| 3.0 | U0 | U1 | < 10 μs |
| 3.0 | U0 | U2 | 100 μs – 2 ms |
| 3.0 | U0 | U3 | ~ 10 ms |
| 3.0 | U1 | U0 | < 10 μs |
| 3.0 | U2 | U0 | 100 μs – 2 ms |
| 3.0 | U3 | U0 | 10 ms |

USING TIMED TRANSPORT STREAM FOR RECEIVER-SIDE INTER-DEVICE COMMUNICATION

CROSS REFERENCE TO RELATED APPLICATIONS

This application claims the benefit of priority to U.S. Provisional Patent Application No. 61/920,386 entitled "Using Timed Transport Stream for Receiver-Side Inter-Device Communication" filed Dec. 23, 2013, the entire contents of which are hereby incorporated by reference.

BACKGROUND

Digital broadcasting typically involves the broadcast of content (e.g., audio, video, or hybrid content) protected by one or more forms of conditional access system and/or digital rights management protocols, and such content is sometimes referred to as "conditional access" content. For example, consumers may be required to purchase a license or subscription to view particular pay channels (e.g., HBO®, Showtime®, pay-per-view events, etc.) before gaining full access to those channels.

Digital broadcasting systems currently utilize one or more conditional access standards (e.g., DVB-CA (conditional access), DVB-CSA (the common scrambling algorithm), and DVB-CI (the Common Interface)). As part of the Common Interface standard receiver devices, such as set-top boxes and integrated digital TVs (iDTVs), receive conditional access content and rely on a removable conditional access module (CAM) coupled to the receiver device to remove the CA/digital rights management protections from the content, such as by descrambling the protected content to provide an unfettered audio/visual output for the user's consumption.

In a manner similar to that of set-top boxes or iDTVs providing content to CAMs, in various other systems, such as vehicle camera and on-board computing systems, digital broadcast content is exchanged over one or more communication interface between two or more devices to provide an unfettered audio/visual output for the user's consumption.

SUMMARY

The systems, methods, devices, and non-transitory media of the various embodiments facilitate real time playback of a digital broadcast by enabling reduction of the amount of time a receiver device's low power mode interface, such as a universal serial bus (USB) interface, with a separate computing device, such as a conditional access module (CAM), operates in an operational/high power mode. The receiver device may associate a stream of media packets of a digital broadcast with system time clock (STC) timestamps indicating when the media packets were received, and store the media packets in a temporary packet buffer. Periodically, a media packet burst stored in the temporary packet buffer may be sent to the separate computing device via a low power mode interface, such as a USB interface, operating in an operational/high-power mode different than a low power mode. After sending the packet burst, the low power mode interface (e.g., the USB interface) may be returned to the low-power mode (e.g., state) until the next burst of packets is sent to the separate computing device. By storing media packets in a temporary buffer and sending packets over the low power mode interface (e.g., the USB interface) in bursts, the receiver device's low power mode interface (e.g., USB interface) may remain in the low-power mode to conserve power.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 5B-5C are tables illustrating link states and transition times between link states for USB interfaces.

DETAILED DESCRIPTION

Figure 1:
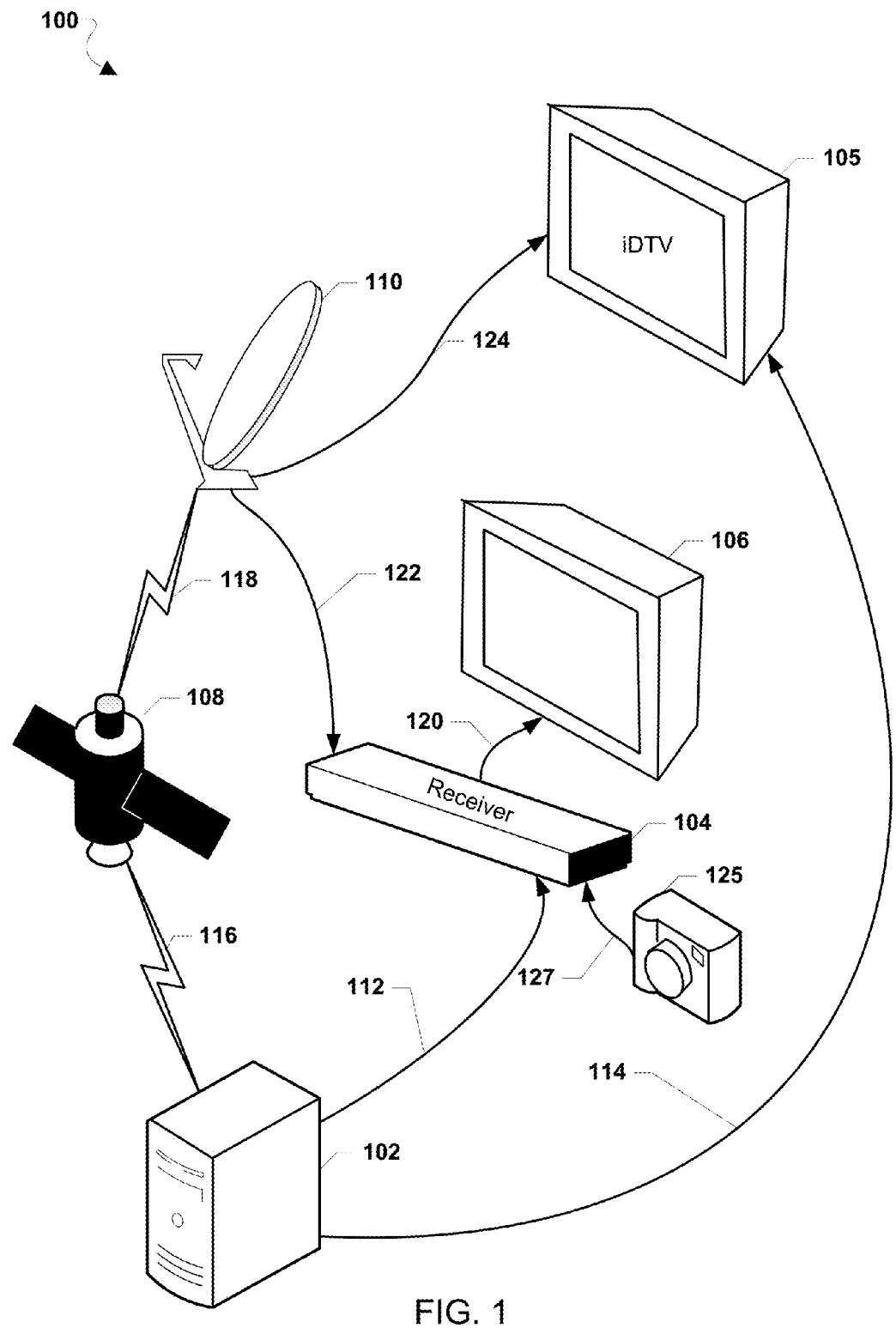
FIG. 1 is a communication system block diagram of a digital broadcast system suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "receiver device" and "host receiver device" are used interchangeably and refer to any one or all of personal or mobile multi-media players, laptop computers, tablet computers, palm-top computers, personal computers, television set top boxes, integrated digital televisions, cable television receivers, digital cameras, in-vehicle computing devices, communication bridge devices, and similar electronic devices which include a programmable processor and memory and circuitry for receiving digital broadcast content.

As used herein, the term "USB interface" generically refers to any one of a USB 2.0 interface, a USB 3.0 interface, and a USB 3.1 interface. Further, as the term "USB interface" is used in the following descriptions, it is anticipated that a person of ordinary skill in the art would be able to determine the specific type of USB interface intended based on context.

In the Common Interface standard, a receiver device hosting a conditional access module (CAM) typically receives content (e.g., audio, visual, or hybrid content) that is encrypted or protected by digital rights management protocols (e.g., scrambled content) from a transmitter system (e.g., a terrestrial broadcast system, a satellite broadcast system, a cable television system, or a fiber optic network, cellular system) in the form of a transport stream signal with an embedded timestamp. This timestamp may be a program clock reference, which is sometimes referred to as a "PCR" timestamp. At the host receiver device, the transport stream signal is demodulated into data packets. The host receiver device passes these data packets to the CAM. The CAM decrypts or descrambles these data packets and sends the descrambled packets to the host receiver device. In response to receiving the descrambled packets from the CAM, the host receiver device marks each packet with a timestamp (i.e., a system time clock or "STC" timestamp) based on the receiver device's system/media clock and decodes the packets for output (e.g., audio/video signals or system signals) that can be rendered by a television, stereo, digital video recorder, or other media rendering device.

The system/media clock (or a derivative) provides times referred to by various components operating on the host receiver device for decoding and presenting decoded content. For instance, the receiver device synchronizes the decoding and play out of packets based on a comparison of the PCR timestamp embedded in the media stream and the STC timestamp associated with each packet after descrambling by the CAM in order to properly render the media and to prevent overflows and underflows.

The most recent version of the Common Interface standard is the Common Interface Plus standard (the "CI+" standard, hereby incorporated by reference). The CI+ standard extends the Common Interface standard by requiring the use of certificates and a certification authority to implement a trusted channel between the CAM and the host receiver device. As part of the CI+ standard, the host receiver device sends demodulated packet streams to the CAM and receives descrambled packet streams from the CAM over a Personal Computer Memory Card International Association (PCMCIA) interface.

A proposed update to the CI+ standard (i.e., the CI+ 2.0 standard) would replace the PCMCIA interface with a universal serial bus (USB) interface. As part of the published USB 2.0 and USB 3.0 standards, each of a USB 2.0 interface and a USB 3.0 interface is capable of changing link states of its link layer to achieve different performance requirements and power demand profiles.

In addition to the proposed update to the CI+ standard used in the delivery of content to CAMs, other systems use USB interfaces to exchange packet streams between devices. For example, vehicle cameras may output a continuous digital broadcast stream of content to a receiver device in the vehicle (e.g., a bridging device) that may connect to a processor of the vehicle's on-board computing system via a USB interface. The vehicle's on-board computing system may decode the content received via the USB interface and output the content to the vehicle's driver via a vehicle mounted display and/or vehicle speaker system.

Currently, a USB interface may operate in an operational mode (e.g., high-power) or one or more low-power modes (e.g., a standby mode), although further operational modes may be defined in future versions of the USB standards. In current implementations, USB interfaces are only able to send packets downstream (e.g., from the host receiver device to the CAM or to the vehicle on-board computing device) while in an operational mode. Frequently, a host receiver device may continuously or nearly continuously generate packets that must be sent to the separate computing device (e.g., a CAM for descrambling) because the host receiver device may constantly receive multiple streaming media services (e.g., pay channels, pay-per-view broadcasts, camera streams, etc.) that require descrambling or other handling. To avoid delays in outputting these packets to audio/visual components for play out, the host receiver device may need to send a packet to the separate computing device (e.g., the CAM) every few microseconds via the USB interface, which requires the USB interface to operate in an operational mode continuously or almost continuously. Thus, current conventional streaming implementations (e.g., the CI+ standard) do not adequately utilize the USB interface's low-power capabilities, resulting in higher overall power usage by the receiver device.

To address the limitations of current implementations of the proposed CI+ 2.0 standard and/or other current USB interface implements described above, the various embodiments provide a receiver device and methods implemented by the receiver device for reducing the amount of time that the receiver device's USB interface to a separate computing device, such as a CAM, must operate in an operational mode (sometimes also referred to herein as a "high-power mode") and increasing the amount of time the USB interface can operate in a low-power mode while maintaining an acceptable user experience (e.g., a consistent play out).

In various embodiments, the receiver device may include a transport stream input interface configured to apply an STC timestamp to media packets as they are received, such as from a transmitter system, vehicle camera, or other media packet generating device or system, and a transport stream buffer configured to store packets generated from the received transport stream. The transport stream buffer may be a temporary buffer configured to store packets for at most a few milliseconds. By only temporarily storing packets for at most a few milliseconds, the transport stream buffer may be distinguished from other buffers or types of memory locations that may support storage of data for longer than a few milliseconds, such as permanent storage. The temporary nature of the transport stream buffer and the feature of only storing packets for at most a few milliseconds may enable the various embodiments to support implementing real time playback of digital broadcasts while also supporting periodic processing of bursts of packets by a CAM (or other devices).

In various embodiments, the receiver device may send a burst of packets stored in the transport stream buffer to the CAM (or other device) over a communication interface, such as a USB interface. In response to receiving the packet burst, the communication interface (e.g., the USB interface) may briefly enter an operational mode to send the packet burst. After sending the packet burst, the communication interface (e.g., the USB interface) may return to a low-power mode until the next burst of packets is ready to be sent to the CAM (or other device). By storing packets in a temporary buffer (i.e., the transport stream buffer) and sending those packets to the CAM (or other device) for further processing (e.g., descrambling, decoding, etc.), the receiver device's communication interface (e.g., the USB interface) may remain in low-power mode for a larger percentage of the time than possible in conventional implementations, thereby reducing the overall power consumption of the receiver device.

By applying the STC timestamp to media packets as they are received, the various embodiments overcome the problem that may arise from buffering media stream packets, which may alter the time at which packets are descrambled by the CAM and/or decoded and output for play out by the receiver device or another device. Thus, the various embodiments mark media stream packets with an STC timestamp when they are received (e.g., during demodulation or immediately after) or at some other point before the media stream packets are stored in the transport stream buffer pending transmission to the CAM (or other device), instead of applying the STC timestamp to packets when they are received from the CAM as is performed in conventional receiver devices. By marking packets with the STC timestamp before they are stored in the temporary buffer (i.e., the transport stream buffer), the receiver device may ensure that the packets are decoded and/or displayed at the appropriate times to support an real time playback even though the packets are temporarily stored in the temporary buffer, and thus processed by the CAM (or other device) periodically.

The various embodiments may be implemented within a variety of digital transmission systems, such as the example transmission system 100 illustrated in FIG. 1. As an example, the system 100 may be a digital television transmission system that may include a transmitter system 102, such as a digital video broadcast network broadcasting media streams provided by a server. The transmitter system 102 may receive content (e.g., digital television programming) from a content provider (not shown), encode/encrypt/scramble the content, and broadcast the encoded, encrypted, and scrambled content for reception by any number of receiver devices 104, 105.

The transmitter system 102 may send content over a physical communication link 112 to a receiver device 104 (e.g., a set-top box) or over a physical communication link 114 to a receiver device 105 (e.g., an integrated digital television). For example, the transmitter system 102 may transmit the content to a satellite 108 over a satellite-based link 116, and the satellite 108 may broadcast the content via broadcast signals 118 that may be received by a satellite receiver 110. The satellite receiver 110 may provide the received signals encoding the media content to receiver devices 104, 105 over a wired communication link 122, 124, respectively. In an embodiment, receiver devices 104, 105 may demodulate, descramble (using a CAM as described herein or another device/component capable of descrambling content), decode, and output the content received from the transmitter system 102 as further described below with reference to FIG. 4A. When the receiver device 104 is a set-top box, the decoded content may be output to another device 106, such as a digital television via a physical communication link 120, and the another device 106 may display video and/or play audio for a user's consumption. When the receiver device 105 is an iDTV, the receiver device 105 may be configured to display and/or play the decoded content locally on the receiver device 105.

As another example, an embodiment system 100 may be a vehicle based system comprising a vehicle camera 124 connected to receiver device 104 that may be connected to the another device 106, such as a vehicle on-board computing system that may include a display or other audio/visual output. The receiver device 104 may receive content from the camera 125 via a wired communication link 127. In an embodiment, the receiver device 104 may output the content received from the camera 125 to the another device 106 via the physical communication link 120 (e.g., a USB interface), such as the vehicle on-board computing system, for display to the driver and passengers of the vehicle in real time.

Various examples of different low power mode interfaces are discussed herein, specifically USB interfaces. The discussions of USB interfaces are provided merely as examples to better illustrate the aspects of the various embodiments, and are not intended to limit the various embodiments in any way. Other low power mode interfaces, such as Peripheral Component Interconnect Express ("PCIe") interfaces, high-speed, inter-chip ("HSIC") interfaces, and super-speed, inter-chip ("SSIC") interfaces, may be used with the various embodiments, and the other low power mode interfaces may be substituted in the various examples without departing from the scope of the claims.

Examples of systems including low power mode interfaces that may implement the various embodiments include digital television transmission systems and vehicle based systems. However, digital television transmission systems and vehicle based systems are merely examples of systems that may implement the various embodiments that are used to better illustrate the aspects of the various embodiments, and are not intended to limit the scope of the application in any way unless specifically recited in a claim. Other systems including low power mode interfaces may be used with the various embodiments, and systems including low power mode interfaces may be substituted in the various examples without departing from the spirit or scope of the invention.

Figure 2:
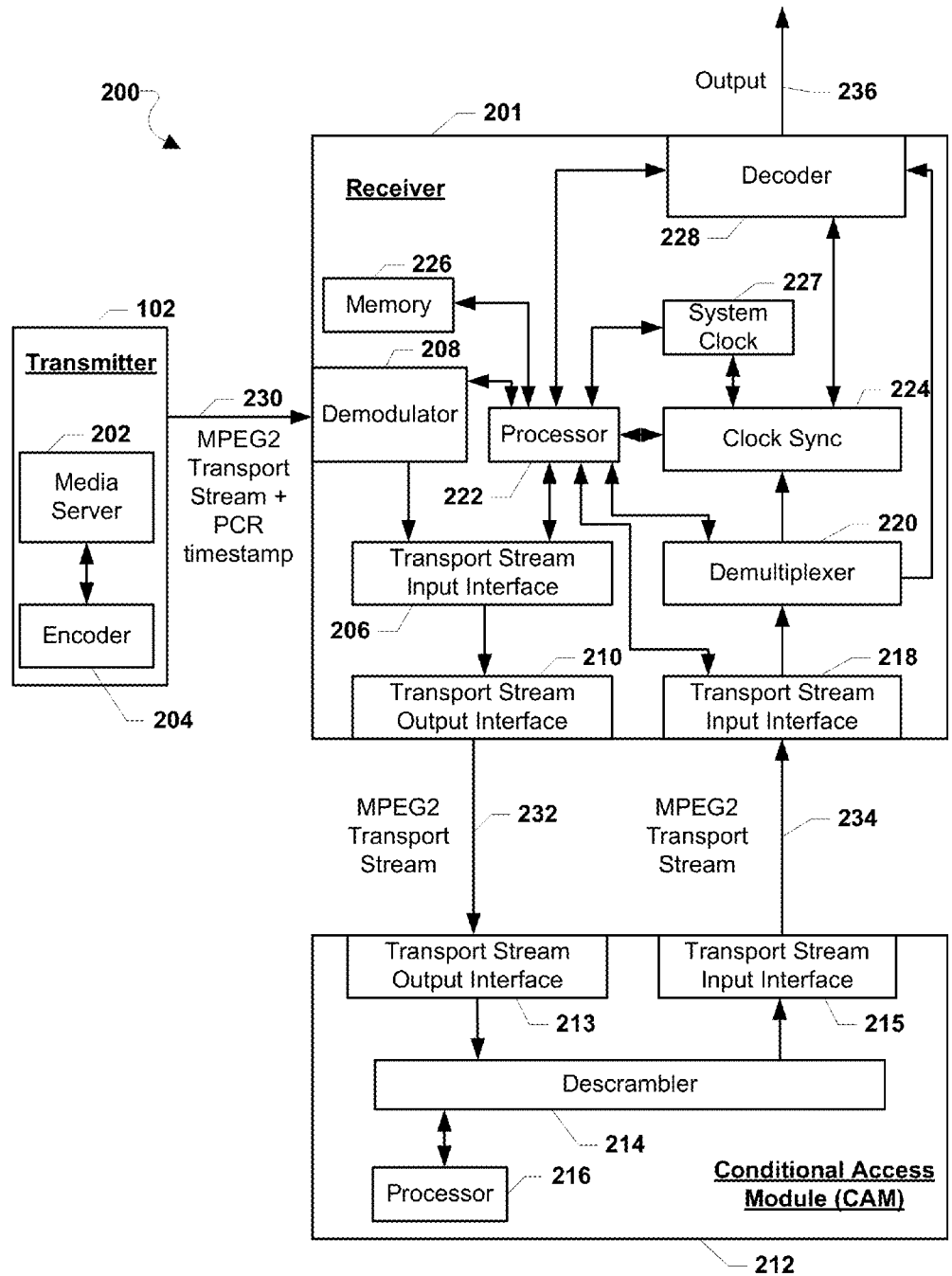
FIG. 2 is a communication system component block diagram including a transmitter system, a conventional receiver device, and a conditional access module.

FIG. 2 illustrates a component block diagram of a conventional transmission system 200. A transmitter system 102 may include a media server 202 coupled to an encoder 204. The transmitter system 102 receives media content (e.g., television programs/broadcast, pay-per-view content, etc.) from a content provider (not shown), and may stage the media for broadcast in the media server 202. The encoder 204 and/or the media server 202 typically encodes and encrypts the content, such as by scrambling the content or by adding other forms of digital rights management protection to the content. The encoder 204 also encodes the content as a MPEG2 transport stream 230. The transmitter system 102 transmits the transport stream 230 to the receiver device 201 over a broadcast medium, such as broadcast wireless signals, satellite broadcast signals, or wired networks (e.g., cable or fiber optic networks) as described above with reference to FIG. 1. The transmitter system 102 also includes, in-band with the MPEG2 transport stream 230, a program clock reference (PCR) timestamp with each media content packet for use on the receiver device 201.

Conventional receiver devices, such as the receiver device 201 illustrated in FIG. 2, include various components used to receive content from the transmitter system 102 and for outputting the content for the receiver devices' users' consumption. As illustrated in FIG. 2, a conventional receiver device 201 includes transport stream input interfaces 206, 218, a demodulator 208, a transport stream output interface 210, a demultiplexer 220, a clock sync unit 224, a system clock 227 utilized by the clock sync unit 224, a decoder 228, a processor 222, and a memory 226.

A demodulator 208 receives the MPEG2 transport stream 230 from the transmitter system 102. The demodulator 208 demodulates the transport stream 230 to produce one or more data packets by converting the analog transport stream 230 signal into a digital bit stream. The data packets are units of data that may include a sync byte, a header, various other transport fields (e.g., air encoding data), and encoded media data. The demodulator 208 sends the generated transport stream packets to a transport stream input interface 206 and the transport stream input interface 206 passes the packets to a transport stream output interface 210, such as PCMCIA interface, which relays the packets to the CAM 212 in the form of an MPEG 2 transport stream 232.

The CAM 212 may include a transport stream output interface 213 and a transport stream input interface 215 coupled to a descrambler 214, and a processor 216 also coupled to a descrambler 214, although the descrambler circuit may be integrated with a processor as a single component or chip. The transport stream output interface 213 receives a stream of packets included in the MPEG2 transport stream 232 sent from the receiver device 201 and sends these packets to the descrambler 214 for descrambling (i.e., removing digital rights management protections for) the packets. By descrambling the media packets, the descrambler 214 enables the receiver device 201 to decode the packets to produce clear, unfettered output (e.g., audio/video/system signals). The descrambler passes the descrambled packets to the transport stream input interface 215, which sends the packets to the receiver device 201 in an MPEG2 transport stream 234.

On the receiver device 201, a transport stream input interface 218 receives the descrambled packets from the CAM 212 and associates each descrambled packet with a system time clock (STC) timestamp as indicated by the system clock 227. The system clock 227—either implemented as a stand-alone component or as part of another component (e.g., the processor 222 or the clock sync 224)—keeps time on the receiver device used by the clock sync unit 224 and decoder 226 as described herein.

The transport stream input interface 218 sends the descrambled packets to a demultiplexer 220, which forwards each packet and/or information regarding each packet to a specific decoder (e.g., a decoder 228) and to the clock sync unit 224. The decoder 228 decodes each packet for output 236 (e.g., audio, video, and or system signals) based on the packets sequential order (e.g., as based on their timestamps). The decoder 228 drops packets received after the packets' scheduled decoding/display time (i.e., "late" packets), waits to decode packets received before their scheduled decoding/display time (i.e., "early" packets), and skips packets that never arrive (i.e., "lost" packets).

Also, as part of the overall decoding and displaying process, the clock sync unit 224 obtains a time from the system clock 227 at which the descrambled packets are to be decoded and displayed and adjusts that time based on a comparison of each packet's PCR and STC timestamps that indicates whether there is a discrepancy between the transmission system's timing and the system clock 227's local timing. In other words, the clock sync unit 224 synchronizes the receiver device 201's decoding and displaying of packets to correspond with the transmission system 102's timing, thereby preventing or reducing delay or jitter in the play out that may be caused by inconsistent rates of packet decode and output introduced on the receiver device 201 and/or the CAM 212.

Figure 3:
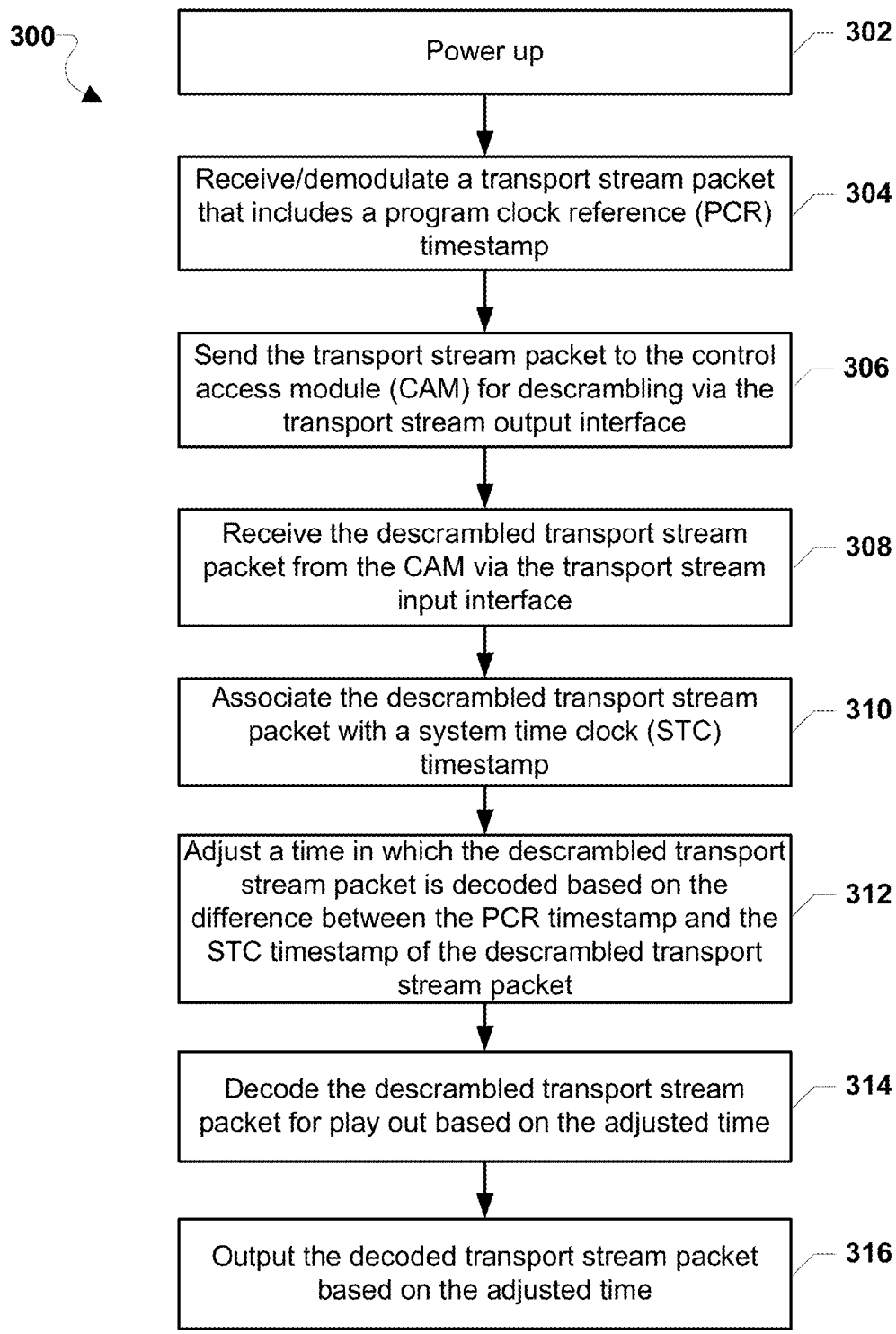
FIG. 3 is a process flow diagram illustrating a conventional method for decoding transport stream packets on a receiver device for play out.

FIG. 3 illustrates a conventional media decoding and rendering method 300 implemented on a conventional receiver device for decoding transport stream packets for output. The method may begin in block 302 when the receiver device powers up, such as in response to receiving a user input on a power-on button.

In block 304, a demodulator operating on the receiver device receives a transport stream that includes a program clock reference (PCR) timestamp from a transmitter system via a transport stream input interface (e.g., a PCMCIA interface) and demodulates the transport stream to generate a transport stream packet associated with that PCR timestamp. The demodulator also sends the transport stream packet to a CAM coupled to the receiver device for descrambling via the transport stream output interface in block 306. As described above with reference to FIG. 2, the descrambler operating on the CAM descrambles the transport stream packet, which may have been scrambled at the transmitter system as part of a digital-rights management scheme for pay-per-view programming, premium channels, etc.

In block 308, the receiver device receives the descrambled transport stream packet from the CAM via the transport stream input interface, and the transport stream input interface associates the descrambled transport stream packet with a system time clock (STC) timestamp in block 310. As described above with reference to FIG. 2, the time sync unit may adjust the time at which the descrambled transport stream packet is decoded based on a difference between the PCR timestamp and the STC timestamp associated with the descrambled transport stream packet in block 312. In other words, the clock sync unit determines whether the receiver device's local timing for decoding and/or displaying the packet (as indicated by the STC timestamp) is synchronized with the transmitter system's timing (as indicated by the PCR timestamp), and the clock sync unit adjusts the packet's decode and/or display timing when there is a discrepancy in order to synchronize the receiver device's decode and/or display timing with the transmitter system's timing, thereby preventing or reducing output jitter (i.e., unwanted variation in the rate of transport stream packet decoding and play out) by managing the rate or timing of decoding and output/display on the receiver device.

The decoder operating on the receiver device decodes the descrambled transport stream packet for play out in block 314 based on the adjusted time determined in block 312 and also outputs the decoded transport stream packet based on the adjusted time in block 316. For example, when the receiver device is a set-top box, the decoder sends the decoded packets to a separate television for play out based on the adjusted system clock time. As another example in which the receiver device is an iDTV, the decoder sends the decoded packets to other components within the television for local play out (e.g., a display screen and speakers included as part of the receiver device) based on the adjusted system clock time.

Figure 4A:
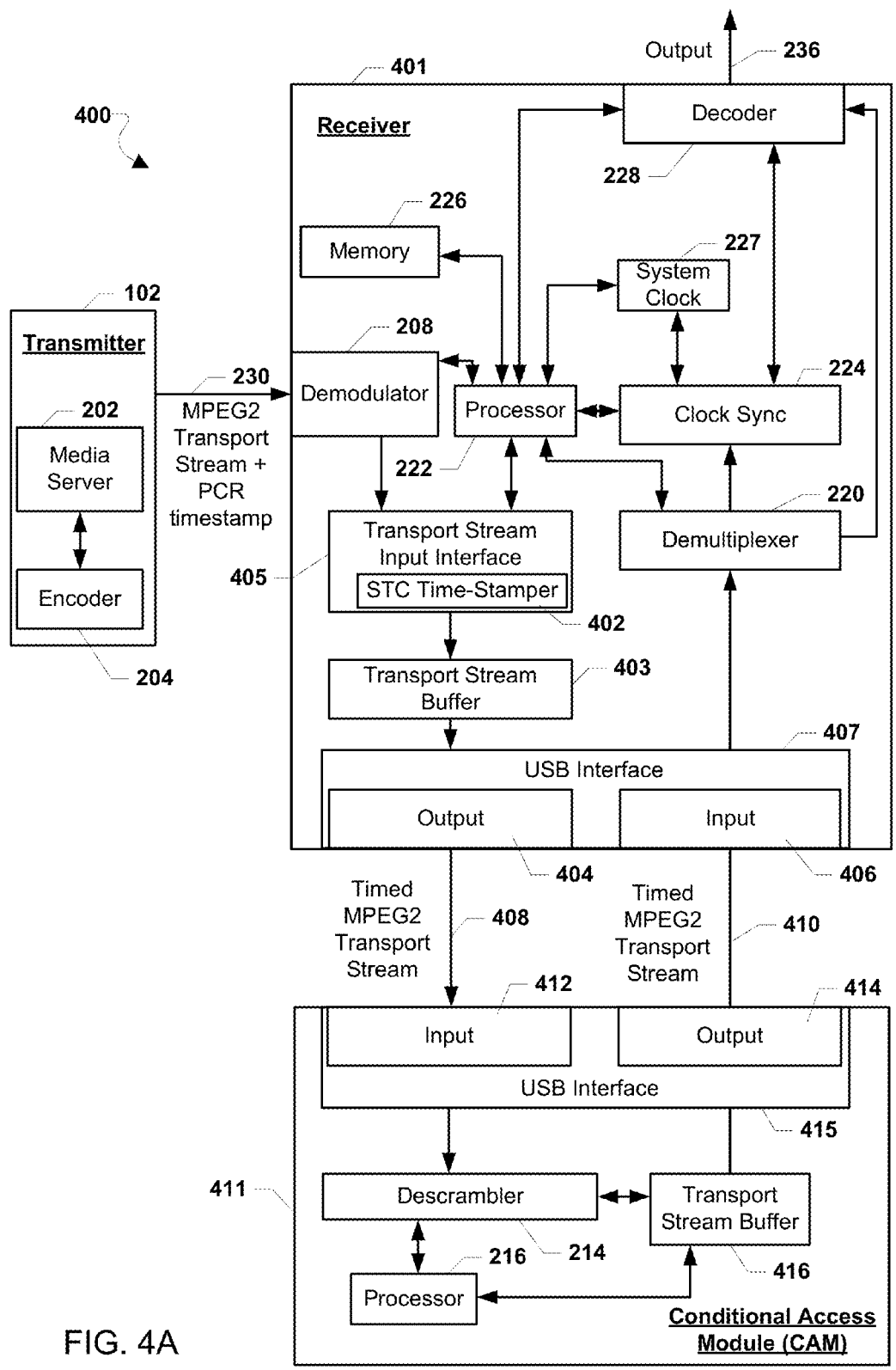
FIG. 4A is a system component block diagram including a transmitter system, an embodiment receiver device, and a conditional access module.

FIG. 4A illustrates a component block diagram of a transmission system 400 that includes an embodiment receiver device 401 configured to include an STC timestamp on media packets as they are received from a transmitter system (rather than as they are received from a CAM as described above with reference to FIG. 2) in order to accommodate packet buffering before processing by the CAM. As described above with reference to FIG. 2, the transmission system 400 may include a transmitter system 102, and a receiver device 401 that includes or is in communication with a conditional access module (CAM) 212. The transmitter system 102 may include a media server 202 and an encoder 204 that are configured as described above with reference to FIG. 2.

The receiver device 401 may include a demodulator 208, a processor 222, a memory 226, a demultiplexer 220, a clock sync unit 224, a system clock 227 utilized by the clock sync unit 224 and/or the processor 222, and a decoder 228 as described above with reference to FIG. 2. An embodiment receiver device 401 may further include a transport stream input interface 405, an STC time-stamper unit 402, a transport stream buffer 403, and a USB interface 407 (e.g., a USB 2.0 interface, USB 3.0 interface, or a USB 3.1 interface) that includes a USB output interface 404 and a USB input interface 406. In an embodiment, the USB output interface 404 and the USB input interface 406 may be implemented in the USB interface 407 as a single USB port. In an embodiment, the transport stream buffer 403 may be a temporary buffer, such as a buffer configured to only store packets for a few milliseconds.

In various embodiments, the STC time-stamper unit 402 may be implemented as part of the transport stream input interface 405 as illustrated in FIG. 4, as part of the a transport stream buffer 403, as a software module implemented by the processor 222, or as a separate module (not shown). Also, in various embodiments the STC time-stamper unit 402, as well as one or more of the other component of the receiver device 401 illustrated in FIG. 4 may be implemented as dedicated circuitry/hardware, as software modules executing on a processor (such as the device processor 222), or in a combination of hardware and software.

In an embodiment, the demodulator 208 may receive the MPEG2 transport stream 230 and accompanying PCR timestamp, generate one or more transport stream packets from the transport stream 230, and associate these packets with the PCR timestamp received as part of the MPEG2 transport stream 230 as described above with reference to FIG. 2. The demodulator 208 may also send the one or more transport stream packets to the transport stream input interface 405. In an embodiment in which the STC time-stamper unit 402 is implemented as part of the transport stream input interface 405, the STC time-stamper unit 402 may assign STC time stamps to packets received from the demodulator 208 based on the receiver device's system clock 227 at the time the packet is/was received by the transport stream input interface 405. Alternatively, STC time stamps may be assigned to packets based on the receiver device's system clock 227 at any time before the packets are stored in the transport stream buffer 403 as further described below.

In further embodiments (not shown), the demodulator 208 may be included on the system-on-chip with the system clock 227 and/or may be able to receive timing information from the system clock 227. In such embodiments, the STC time-stamper unit 402 may be implemented as part of the demodulator 405 and may assign STC timestamps to packets as part of the demodulation process based on the receiver device's system clock 227 at or after the time the packet is/was generated by demodulator 208.

Demodulated and STC-time stamped transport stream packets may be stored in the transport stream buffer 403. In an embodiment, the transport stream buffer 403 may be implemented as part of the memory 226 or as a separate memory within the receiver device. As discussed above, regardless of how the transport stream buffer 403 is implemented, the transport stream buffer 403 may be a temporary buffer, such as a buffer configured to only store packets for a few milliseconds.

In an embodiment, while the transport stream buffer 403 may be a temporary buffer, a relatively larger temporary transport stream buffer 403 may be able to store more packets, thereby enabling the receiver device 401 to wait a longer period of time before sending those packets in a burst to the CAM 411. Thus, the size of the transport stream buffer may be initially set or dynamically adjusted (e.g., by the processor 222 executing a software application) to achieve desired levels of power reduction by specifying how many packets can be stored in the buffer before they are sent in a burst, thereby providing a mechanism to dynamically control how long the USB interface may remain in a low-power mode before having to send the next packet burst. For example, the processor 222, or another circuit on the receiver device 401, may implement a relatively large transport stream buffer instead of a relatively smaller buffer so that packets may be stored in the buffer over a relatively longer temporary period of time before the packets are sent in bursts to the CAM (e.g., when the buffer is full), thereby reducing the amount of time the USB interface 407 must operate in an operational mode.

In another embodiment, the size of the transport stream buffer 403 may also be based on the capabilities of the CAM 411 (e.g., the CAM 411's ability to receive packet bursts of a certain size, etc.). Similarly, in another embodiment, the processor 222, or another component operating on the receiver device 401, may implement a timing mechanism to manage when packet bursts are sent to USB interface 407, thereby effectively controlling the latency for the operational mode of the USB interface 407.

Unlike conventional receiver devices that pass the flow of media packets unimpeded from the receiver device to the CAM as described above with reference to FIG. 2, the receiver device 401 of FIG. 4A according to various embodiments may store a plurality of transport stream packets in the transport stream buffer 403 before they are sent to the CAM 411 to enable the receiver device 401 to send packets to the CAM 411 in bursts. In other words, multiple packets may be stored in the transport stream buffer 403, and when a packet burst threshold condition is met (e.g., when a certain number of packets have been stored—which may also depend on the size of the buffer as described above, when a certain amount of time has elapsed, when signaling requesting the next packet burst is received from the CAM 411, when signaling of the buffer level is received from the decoder, when a discontinuity in the PCR timestamps is detected, and/or when various other triggering events based on the transport stream itself or the other components occur), the processor 222 or another component on the receiver device 401 may send the packets stored in the transport stream buffer 403 to the CAM 411 in rapid succession (i.e., as a timed MPEG2 transport stream 408) via the USB output interface 404. In a further embodiment, the packet burst threshold may be based on a required latency of one or more transport stream packets. For example, a packet requiring a low latency may immediately satisfy the packet burst threshold and may be passed to the USB interface 407 for transmission to the CAM 411 without a significant delay.

The media packets sent in a burst may already be associated with both a PCR timestamp and an STC timestamp. Thus, a timed MPEG2 transport stream 408 differs from a conventional MPEG2 transport stream described above with reference to FIG. 2 (e.g., MPEG2 transport streams 232, 234) because the packets sent by receiver 401 include the STC timestamp that was applied when the packets were received (versus after descrambling by the CAM 212).

In an embodiment, by applying the STC timestamp to the packets before they are stored in the transport buffer 403, the transport stream buffer 403 may be managed by software applications executing on the receiver device 401 without affecting the synchronization of the system clock 227 as described below, because any jitter introduced by the software application (in contrast to a buffer management system implemented in hardware) may occur after the STC timestamp is applied and, therefore may be accounted for during the decoding and displaying phases.

In an embodiment, the USB interface 407 may remain in a low-power state except when the USB output interface 404 is transmitting a burst of media packets to the CAM 411 and/or when the USB input interface 406 is receiving descrambled packets from the CAM 411. Thus, in such an implementation, the USB interface 407 may consume less power on average than in a conventional implementation because it can spend the majority of time in the low-power mode between transmissions and receptions of media packet bursts. The process of sending packet bursts via the USB output interface 404 in an operational/high-power mode to enable the USB output interface 404 to return to a low-power mode at other times is further described below with reference to FIGS. 5A-5C and 7A-7B.

In another embodiment, the packet bursts sent to the CAM 411 over the USB interface 407 (or similar interfaces) may be organized to take advantage of the standard sizes of USB packets. In other words, the processor 222 or another circuit on the receiver device 401 may aggregate packets stored in the transport stream buffer 403 and send them to the CAM 411 based on the USB maximum packet size or the maximum transfer size of the USB interface in order to improve the throughput and power usage of the USB interface 407. For example, a transport stream packet may be 188 bytes, excluding the timestamp information (e.g., 4 to 7 bytes), and these packets may be aggregated together and/or stored in the transport stream buffer 403 as groups that are the maximum USB packet size (i.e., 512 bytes for a USB 2.0 packet and 1024 bytes for a USB 3.0 packet), and the processor 222 or other circuit may send these maximum-USB-packet-sized groups of packets to the CAM 411. In further embodiments, the processor 222 or another circuit may send the entire accumulated buffer as one transfer/burst to the CAM 411 to improve efficiency.

In an embodiment, the CAM 411 may receive the timed MPEG2 transport stream 408 via a USB input interface 412, which may be in communication with the USB output interface 404 operating on the receiver device 401. In an embodiment, the USB output interface 414 and the USB input interface 412 may be implemented in the USB interface 407 as a single USB port.

The CAM 411 may also utilize the descrambler 214 and/or processor 216 to descramble and/or decrypt the transport stream packets included in the timed MPEG2 transport stream 408 as described above with reference to FIG. 2. The CAM 411 may also store descrambled packets in a transport stream buffer 416 that may function similarly to the transport stream buffer 403 on the receiver device 401. The CAM 411 may also send packets stored in the transport stream buffer 416 to the USB input interface 406 operating on the receiver device 401 as a timed MPEG2 transport stream 410 via the USB output interface 414.

In an embodiment, because the USB interface 407 may need to operate in an operational mode to receive packets as well as to send them, the CAM 411 may be configured to operate at high performance and/or utilize a smack buffer in order to reduce the amount of time it takes the CAM 411 to descramble packets received from the USB output interface 404 and send those descrambled packets to the receiver device 401 via the USB input interface 406. This embodiment may further reduce the amount of time that the USB interface 407 operates in the operational mode.

The USB input interface 406 may pass the descrambled packets in the timed MPEG2 transport stream 410 to a demultiplexer 220, which may send each packet to a clock sync unit 224 and/or a decoder 228 as described above with reference to FIG. 2. The clock sync unit 224 may compare the PCR and STC timestamps associated with each descrambled packet and may adjust the rate and/or timing of the decode and/or output 236 (e.g., audio/video output or system signals) of descrambled packets based on that comparison as described above with reference to FIG. 2. Because the STC timestamp are applied to the media packets as they are received and before they are stored in the buffer, the clock sync unit 224 may accurately adjust the packets' decoding and output timing relative to the receiver device's system clock 227. In other words, without the ability to synchronize the decoding and display of media packets with the incoming transport stream using an STC timestamp applied when received from the transmitter system 102, delays introduced by temporarily storing some media packets in the transport stream buffer 403 on the receiver device 401 could cause jitter and lag in the rendered media. This method of applying the STC timestamp as media packets are received may also remove any jitter or lag due to additional delay in the CAM 411 caused by descrambling packets in a burst and/or by storing packets in the transport stream buffer 416. Further, the decoder 228 may achieve higher averaging of performance requirements and/or better error handling because the decoder 228 does not receive the media packets in real time.

While the receiver device 401 and CAM 411 are described above as using and implementing USB interfaces according to an embodiment, in alternative embodiments the receiver device 401 and CAM 411 may implement various other types of communication interfaces that have the capability of switching from an operational mode to a low-power mode similar to that described above. For example, the receiver device 401 and the CAM 411 may utilize a Peripheral Component Interconnect Express ("PCIe") interface. Other examples may include a high-speed, inter-chip ("HSIC") interface, and a super-speed, inter-chip ("SSIC") interface. Thus, any reference to a USB interface is merely for consistency and ease of description, and is not intended to limit the scope of the embodiments unless explicitly recited in the claims.

Also, while the above description relates to interactions between a receiver device and a CAM, the process of applying STC timestamps to packets as they are received as described above may be implemented on and benefit other systems in which a receiver device sends media packet bursts to a separate computing device and retrieves those media packets at some later time for decoding and play out. For example, operations similar to the ones described above may be implemented when a receiver device generates a timed transport stream of media packets and stores these media packets in a separate computing device (e.g., a digital video recorder) for later decoding and playback, thereby improving play out by reducing delay and jitter as described above. Thus, any reference to a CAM is merely for consistency and ease of description, and is not intended to limit the scope of the embodiments unless explicitly recited in the claims.

Figure 4B:
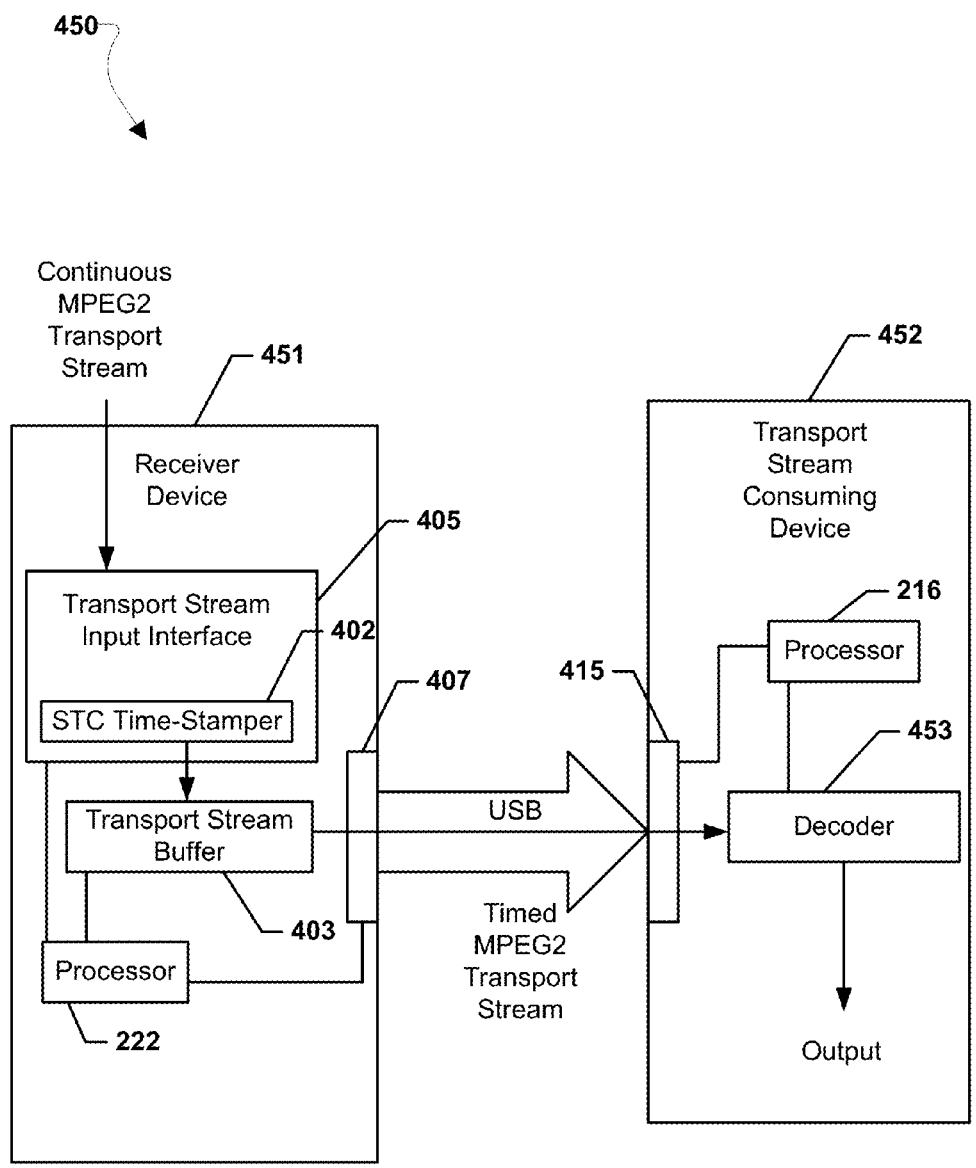
FIG. 4B is a system component block diagram of an embodiment USB interface between a transport stream consuming device.

FIG. 4B illustrates an embodiment system 450 including a USB interface between a receiver device 451 and a transport stream consuming device 452. The system 450 illustrated in FIG. 4B is similar to the system 400 described above with reference to FIG. 4A, except that the system 450 may not include a CAM. Additionally, rather than providing the transport stream packets back to the receiver device 401 for decoding in system 400 as described above, in the system 450 illustrated in FIG. 4B the continuous MPEG2 transport stream may not be encrypted and/or require demodulating, and the receiver device 451 may operate as a bridging device that merely provides the continuous MPEG2 transport stream to the transport stream consuming device via the USB interfaces 407, 415 for decoding at the transport stream consuming device 452. In a manner similar to that described above, the transport stream input interface 405 may receive the continuous MPEG2 transport stream, apply an STC time stamp with the STC time-stamper 402, and store the STC stamped packets in the temporary transport stream buffer 403. The transport stream input interface 405, transport stream buffer 403, and/or the USB interface 407 may be coupled to the processor 222, which may be configured with processor-executable instructions to control the operations of the transport stream input interface 405, transport stream buffer 403, and/or USB interface 407. When a packet burst threshold (e.g., one of a time threshold and a size threshold) is reached, the USB interface may be transitioned from a low-power mode to an operational mode (i.e., a mode other than low-power) to send a burst of packets to the USB interface 415. Upon sending the burst of packets the USB interface 407 may return to the low-power mode. The packet burst threshold (e.g., the time threshold and/or the size threshold) may be selected to increase an amount of time that the USB interface 407 remains in the low-power mode while providing an acceptable user experience, such as a continuous playback of a digital broadcast. The burst of packets received by the USB interface 415 may be sent to the decoder 453, and the STC time stamps in the packets may be used to decode the packets and output a real time playback of the digital broadcast. The USB interface 415 and/or decoder 453 may be coupled to the processor 216, which may be configured with processor-executable instructions to control the operations of the USB interface 415 and/or decoder 453.

Figure 5A:
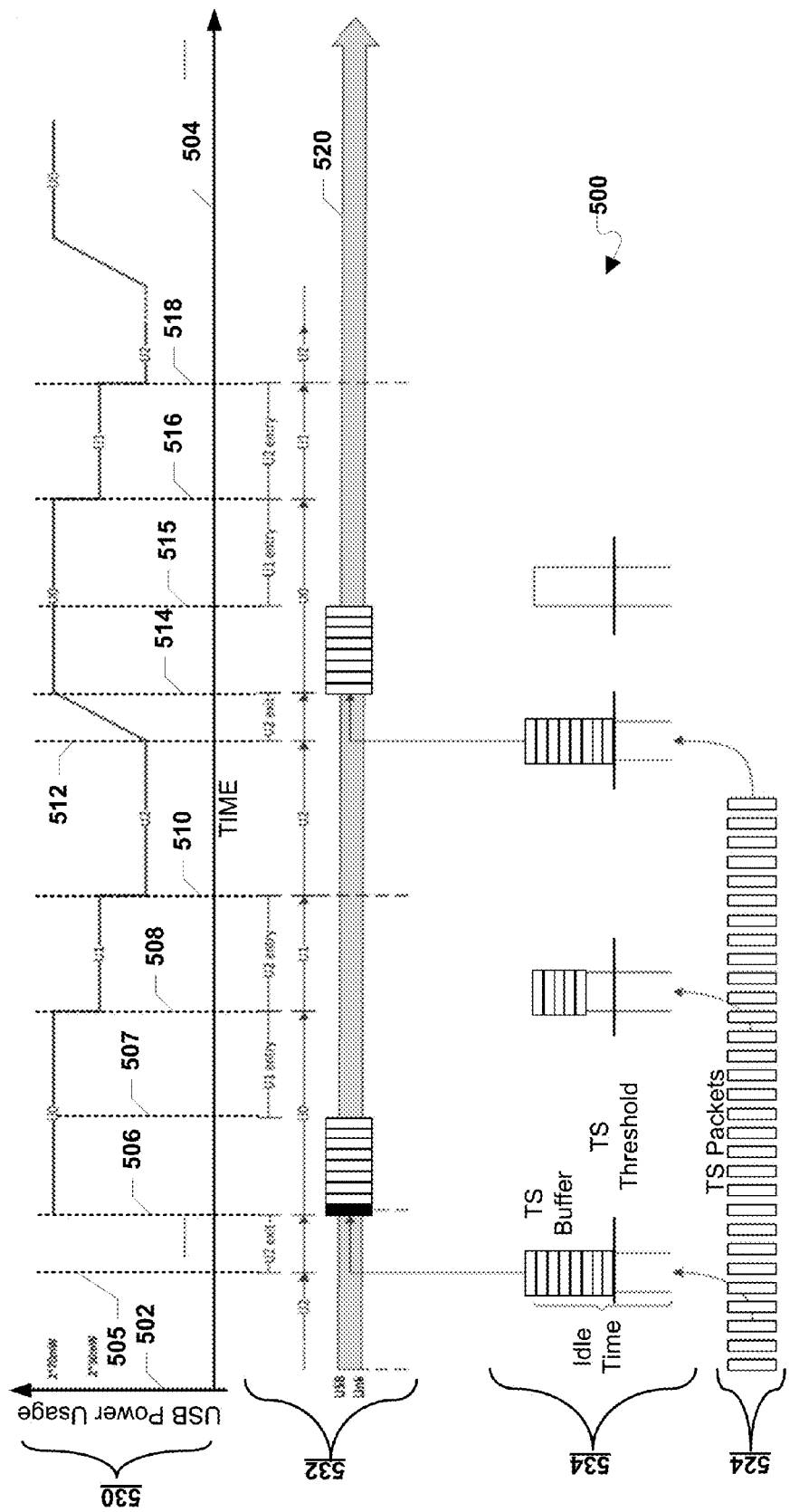
FIG. 5A is a timeline diagram illustrating changes in power levels over time of a USB interface operating on an embodiment receiver device when sending packet bursts over the USB interface is implemented on the receiver device.

FIG. 5A illustrates a timeline diagram 500 of changes in power usage over time for a USB interface operating on a receiver device according to an embodiment.

As described above with reference to FIG. 4A, a demodulator operating on an embodiment receiver device may generate multiple transport stream packets 524 that are stored in a transport stream buffer 534. At a certain time 505, a transport stream buffer threshold or packet burst threshold (labeled in FIG. 5A as "TS Threshold") may be satisfied or exceeded (e.g., a threshold number of packets may have been stored in the transport stream buffer 534), and the packets stored in the transport stream buffer 534 may be sent to the USB interface 532 in a burst at time 505 for transmission to the CAM (not shown).

As illustrated by the power usage graph 530 in FIG. 5A, the USB interface 532 may enter different link states at different power modes over time 504 that require different amounts of power (represented on the "USB Power Usage" axis 502). Specifically, the USB interface 532 may adjust its power mode based on whether it is currently handling packets ready to be sent out or sending out those packets, such as those media packets received from the transport stream buffer 534 beginning at the time 505. For example, as listed in table 550 illustrated in FIG. 5B, USB 3.0 interfaces (e.g., the USB interface 534) may operate in one of numerous link states/power modes, such as in an operational mode ("U0" mode") used during full-operation (e.g., packet transmissions) and low-power modes that require decreasing amounts of power (i.e., "U1" mode, "U2" mode, and "U3" mode, respectively). Table 550 also illustrates similar power modes/link states for USB 2.0 interfaces (i.e., "L0"-"L3" modes).

The power-usage graph 530 also illustrates that the USB interface 532 may require a certain amount of time to transition from one power mode/link state to another. For example, as indicated in table 575 illustrated in FIG. 5C, a USB 3.0 interface may require 100 microseconds to two milliseconds to transition from a U2 mode to a U0 mode (i.e., to transition from a low-power mode to a fully-operational power mode).

In the example illustrated in FIG. 5A, in response to receiving the packet burst from the transport stream buffer 534 at time 505, the USB output interface 532 may begin transitioning from a low-power mode ("U2" mode) to an operational mode ("U0" mode) required to transmit the packets to the CAM. Thus, from a time 506 to a time 507, the USB output interface 532 may send the packet burst received from the transport stream buffer 522a to the CAM in an operational mode (i.e., "U0" mode). When the USB interface 532 has finished sending the burst at the time 507, the USB interface 532 may begin transitioning to a U1 mode (labeled in FIG. 5A as "U1 entry") and may enter U1 mode at a time 508. As illustrated in FIG. 5A, even though the USB interface 532 has finished sending packets by time 507, the USB interface may continue to consume a comparably high amount of power as long as it remains in U0 mode. The USB interface 532 may continue using a high amount of power throughout U0 mode because a USB physical layer that consumes a considerable amount of power may always be active while in U0 mode, regardless of whether the USB interface 532 is currently sending packets.

Similarly, the USB interface 532 may begin transitioning from U1 mode to the U2 mode (labeled in FIG. 5A as "U2 entry") at time 508 and may enter the U2 mode at a time 510. The USB interface 532 may remain in the U2 mode until the next packet burst is received at time 512.

Starting at a time 506, the transport stream buffer 534 may continue receiving/storing packets until a time 512, at which point the transport stream threshold may have been satisfied/exceeded again. At time 512, the transport stream buffer 534 may send the stored packets as a burst to the USB interface 532 for delivery to the CAM. After the next packet burst is sent from the transport stream buffer 534, the buffer 534 may be empty, and the process described above may repeat in a loop as more transport packets 524 are stored in the buffer 534.

In response to receiving the next packet burst starting at a time 512, the USB interface 532 may transition from a U2 mode to U0 mode (labeled in FIG. 5A as "U2 exit") from a time 512 to a time 514 in preparation of sending the packet burst and may begin sending the next packet burst to the CAM starting at time 514. When the USB interface 532 has sent the last packet in the packet burst at time 515, the USB interface 532 may transition from U0 mode to U1 mode from time 515 to time 516. As described above, the USB interface 532 may also transition from U1 mode to U2 mode from time 516 to time 518. The process may repeat in a loop as long as the transport stream buffer continues sending packet bursts for transmission to the CAM.

In further embodiments, the USB interface 532 may operate in an operational mode (e.g., U0 mode) both while sending packets to the CAM and while receiving packets back from the CAM as described above.

Figure 6A:
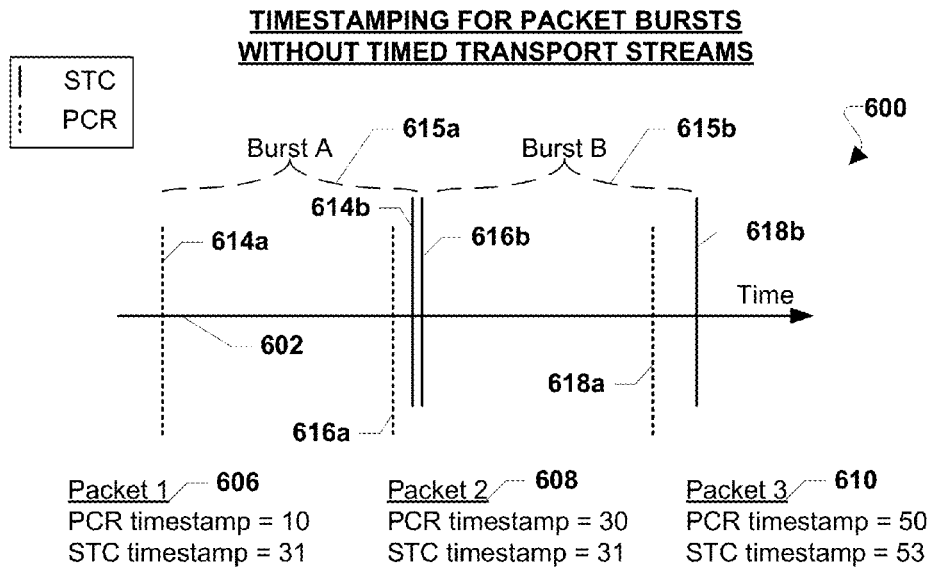
FIGS. 6A and 6B are timeline diagrams illustrating the effects of different time-stamping implementations.
Figure 6B:
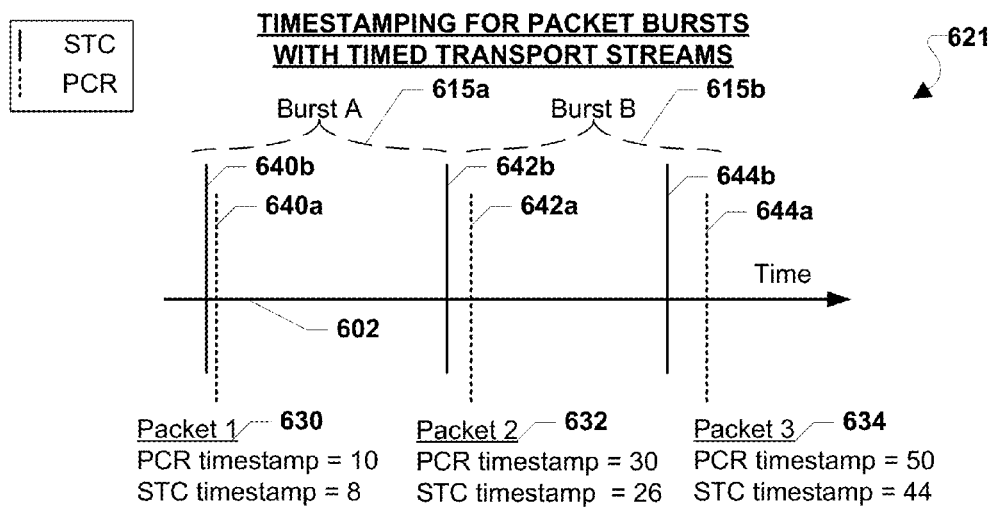

FIGS. 6A and 6B illustrate timeline diagrams 600, 620 showing the relationship between a packets' PCR and STC timestamps when those packets are sent in bursts over time 602. Specifically, timeline diagram 600 in FIG. 6A illustrates the inaccurate characteristics of media packets' STC timestamps relative to their corresponding PCR timestamps when the media packets receive STC timestamps after, for example, being stored in a buffer on the receiver device and returned by the CAM. In contrast, timeline diagram 621 in FIG. 6B illustrates the comparatively more-accurate characteristics of media packets' STC timestamps relative to their corresponding PCR timestamps when the media packets receive STC timestamps before they are stored in the transport stream buffer.

In an embodiment, a clock sync unit may determine whether to adjust the rate or timing of decoding and display of media packets by calculating the change in the packets' PCR and STC timestamps. For example, the clock sync unit may use the equation $(PCR_2-PCR_1)-(STC_2-STC_1)$ to determine the extent to which to adjust the rate and/or timing of decoding and display of media packets on the receiver device, wherein $PCR_1$ and $STC_1$ are PCR and STC timestamps associated with a first packet and wherein $PCR_2$ and $STC_2$ are PCR and STC timestamps associated with a second packet received after the first packet.

In the example illustrated in FIG. 6A, a first packet 606 may receive a PCR timestamp 614a corresponding to a transmitter system time of "10," and a second packet 608 may receive a PCR timestamp 616a corresponding to a transmitter system time of "30." The first and second packets 606, 608 may also be stored in a transport stream packet and sent in a first burst 615a to the CAM. When returned from the CAM, the first packet 606 may receive an STC timestamp 614b corresponding to a local time of "31," and the second packet 608 may receive an STC timestamp 616b also corresponding to a local time of "31." Similarly, a third packet 610 may receive a PCR timestamp 618a corresponding to a transmitter system time of "50," may be stored for a period of time in the transport stream buffer until sent in a second burst 615b to the CAM, and may receive a STC timestamp 618b corresponding with a local time of "53" on returning from the CAM.

As illustrated in FIG. 6A, the packets 606, 608, 610 may have STC timestamps 614b-618b that are delayed and/or grouped together as a result of being stored in the buffer and sent in bursts. Thus, the STC timestamps 614b-618b may indicate times that deviate greatly from their corresponding PCR timestamps 614a-618a and may prevent the clock sync unit from accurately adjusting the rates and/or times at which the packets 606, 608, 610 are decoded and/or displayed, thereby leading to inconsistent play out and degraded performance on the receiver device.

For example, the clock sync unit may use the equation described above to calculate a time adjustment factor of 20 (e.g., an indication to speed up decoding and display) between the first and second packets 606, 608 and may immediately calculate an adjustment factor of −2 between the second and third packets 608, 610 (e.g., an indication to slow down decoding and display). Given these inconsistent results, the clock sync unit in this example may be unable to successfully synchronize the rates/times at which the packets 606, 608, 610 are decoded and displayed with the times indicated by the PCR timestamps 614a-618a of the packets 606, 608, 610.

In the example illustrated in FIG. 6B, packets may be time stamped with a PCR timestamp and a STC timestamp prior to being stored in a transport stream buffer, in contrast to the example illustrated in FIG. 6A. Thus, a first packet 630 may receive a PCR timestamp 640a corresponding with a transmitter time of "10," receive an STC timestamp 640b corresponding with a local time of "8," and be stored in a transport stream buffer. Similarly, a second packet 632 may receive a PCR timestamp 642a corresponding with a transmitter system time of "30," receive an STC timestamp 642b corresponding with a local time of "26," and stored in a transport stream buffer with the first packet 630, and the first and second packets 630, 632 may be sent from the buffer to the CAM in a first burst 615a. A third packet 634 may be associated with a PCR timestamp 644a corresponding with a transmitter system time of "50" and may receive a STC timestamp 644b corresponding to a local time of "44" and may be stored in a buffer and sent to the CAM in a second burst 615b.

As illustrated in FIG. 6B, applying the STC timestamps 640b-644b before the packets 630, 632, 634 are delayed avoids the degrading effects of sending the packets in a burst as described above with reference to FIG. 6A. Thus, any delay resulting from being stored and sent to the CAM in bursts may not be reflected in the STC timestamps 640b-644b of the packets' 630, 632, 634, thereby enabling the clock sync unit to accurately adjust the rate/timing at which the packets 630, 632, 634 are decoded and/or displayed.

For example, using the equation defined above, the clock sync unit may calculate an adjustment factor of 2 between the first and second packets 630, 632, and may also calculate an adjustment factor of 2 between the second and third packets 630, 632. Based on these consistent calculations, the clock sync unit may determine that decoding/displaying times may need to be adjusted by a factor of 2.

Figure 7A:
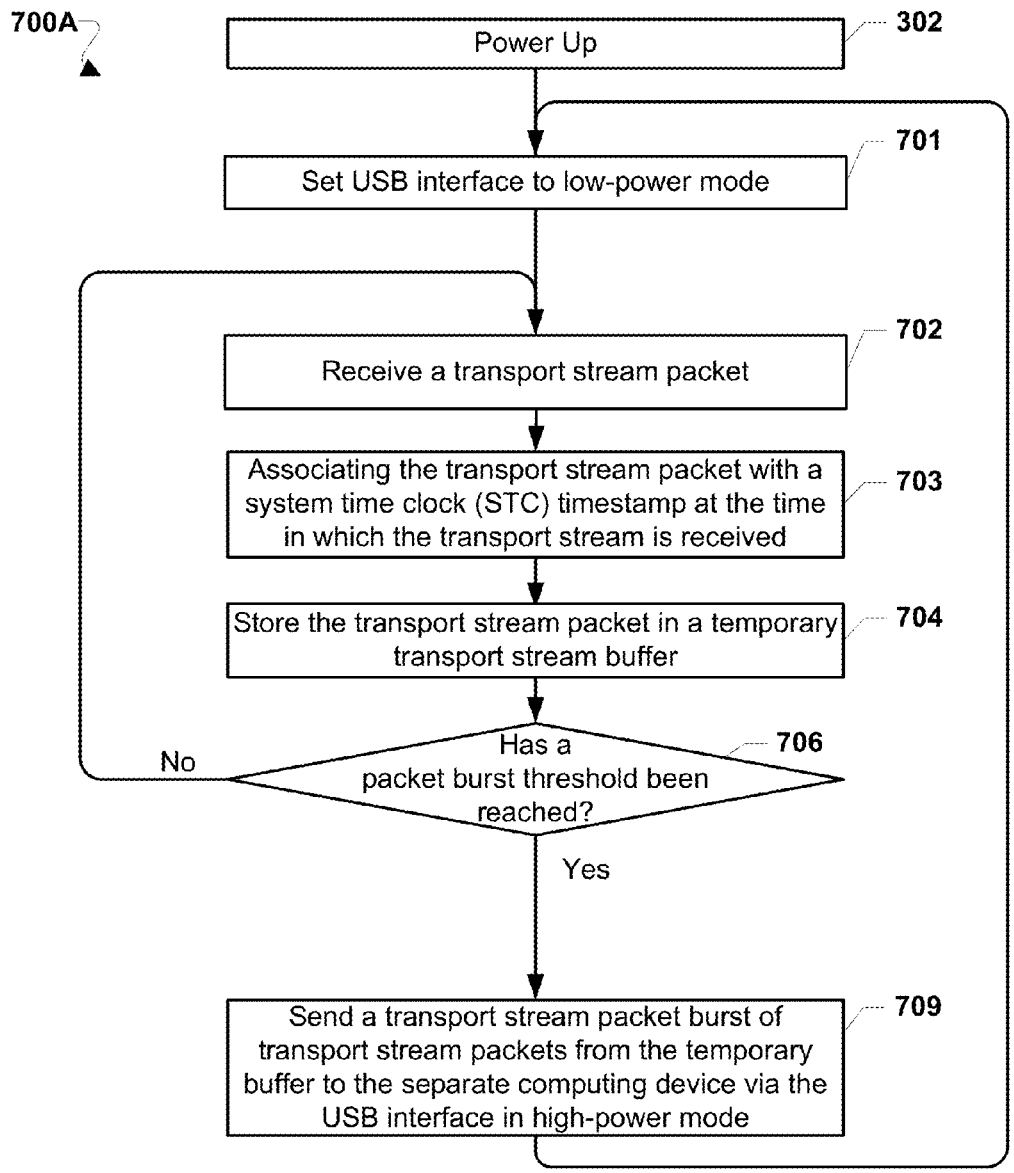
FIG. 7A is a process flow diagram illustrating an embodiment method for implementing a low-power USB scheme on a receiver device.

FIG. 7A illustrates an embodiment method 700A for implementing a low-power USB scheme on a receiver device that may be implemented by one or more components operating on a receiver device for sending bursts of packets over a USB interface to a separate computing device. The operations of the method 700A may begin in block 302 when the receiver device powers up as described above with reference to FIG. 3.

In block 701, a processor, or other circuit on the receiver device, may configure the USB interface to the separate computing device to operate in a low power mode. In an embodiment, the USB interface may initially enter a low power mode during start up, and while in a low-power mode, the USB interface may be in a low-power mode during which it may not receive or transmit data.

In block 702, a transport stream interface and/or a time-stamper unit operating on the receiver device may receive a transport stream packet. For example, a transport stream packet may be received by one or more modules of the receiver device (e.g., a demodulator) demodulating an analog transport stream to generate a transport stream packet. As another example, transport stream packets may be provided directly to the receiver device, such as by a digital connection to a camera encoder.

A transport stream interface and/or a time-stamper unit operating on the receiver device may associate media packets within the transport stream packet with a system time clock (STC) timestamp in block 703 at the time that media packets are received in block 702. As discussed above, the operation of applying an STC timestamp to media packets may occur at any time before the media packets are stored in the transport stream buffer.

In block 704, the transport stream packets may be stored in a temporary transport stream buffer as described above with reference to FIG. 4A or 4B. A receiver device processor or another circuit may determine whether a packet burst threshold value has been reached in determination block 706. In an embodiment, the packet burst threshold may correspond to one or more criteria that may indicate that a certain number of packets have been buffered (e.g., a size threshold) and/or that a certain amount of time has elapsed since the last burst of media packets were descrambled (e.g., a time threshold). In an embodiment, the packet burst threshold may correspond to or take into account an amount of time (e.g., a time threshold) required for the USB interface to enter low-power mode. For example, the packet burst threshold may be 25 microseconds, and thus the USB interface may require 10 microseconds to enter low-power mode after sending a packet burst to the another device in an operational mode. This example amount of time may enable the USB interface to remain in low-power mode for 15 microseconds before switching to an operational mode to send another packet burst. Thus, the packet burst threshold (e.g., the time threshold) may be set to ensure that the USB interface may remain in low-power mode for a certain amount of time or a certain percentage of the time between sending packet bursts. In a further embodiment, the packet burst threshold may be configurable and may be based at least in part on the nature of the low-power mode to which the USB interface is transitioning and the amount of time needed to transition to that low-power mode. As another example, transport stream packets may be buffered in the transport stream buffer until a certain number of packets (e.g., the size threshold) is reached before the packets are sent to the separate computing device in a burst.

In a further embodiment, the packet burst threshold (e.g., the time threshold and/or the size threshold) may be selected to increase an amount of time that the USB interface remains in the low-power mode while providing an acceptable user experience, such as a continuous playback of a digital broadcast. In another embodiment, the packet burst threshold may be a threshold based on timestamps, such as PCR timestamps, in the packets themselves. For example, the packet burst threshold may be selected such that the packet burst threshold is reached when a discontinuity in the PCR timestamps, such as a maximum time between successive PCR timestamps being exceeded, is detected by the processor or other circuit.

In response to a processor or other circuit determining that the packet burst threshold has not been reached (i.e., determination block 706="No"), media packets may continue to be received, time stamped, and stored in the transport stream buffer in blocks 702, 703, and 704 as described above.

In response to a processor or other circuit determining that the packet burst threshold has been reached (i.e., determination block 706="Yes"), a burst of transport stream packets may be sent via the USB interface in a high-power mode from the buffer to the separate computing device in block 709. As described above, the USB interface may automatically enter an operational mode in response to receiving the packet burst for delivery to the separate computing device, such as by transitioning from a low-power mode to the high-power mode. Upon sending the packet burst in block 709, the USB interface may transition back to low-power mode in block 701.

Figure 7B:
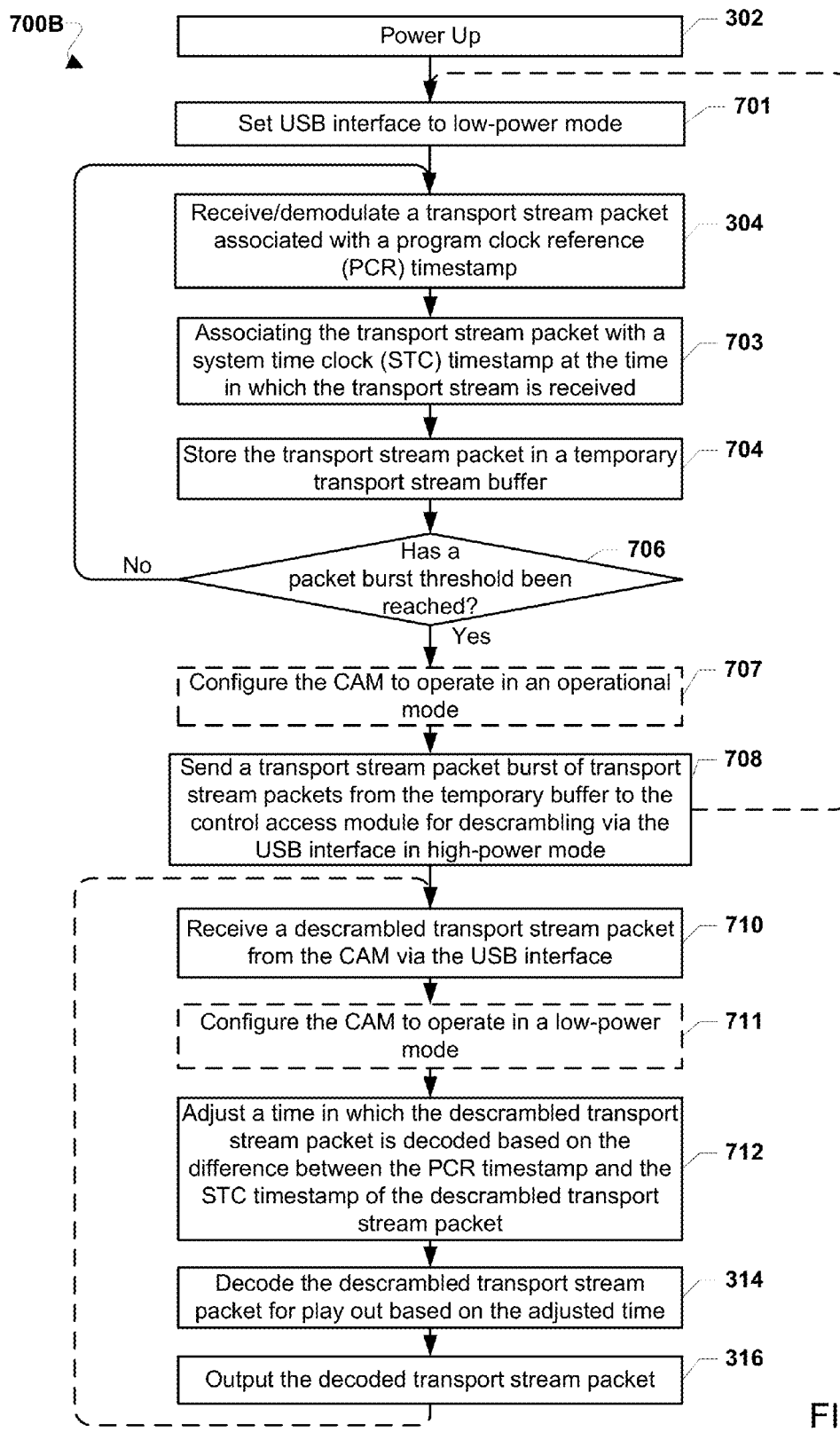
FIG. 7B is a process flow diagram illustrating an embodiment method for implementing a low-power USB scheme on a receiver device when decoding transport stream packets for play out.

FIG. 7B illustrates an embodiment method 700B for implementing a low-power USB scheme on a receiver device that may be implemented by one or more components operating on a receiver device for sending bursts of packets to a CAM for descrambling over a USB interface. The operations of the method 700B may begin in block 302 when the receiver device powers up as described above with reference to FIG. 3. In block 701, a processor or other circuit on the receiver device may configure the USB interface to the CAM to operate in a low power mode. In an embodiment, the USB interface may initially enter a low power mode during start up, and while in a low-power mode, the USB interface may be in a low-power mode during which it may not receive or transmit data.

In block 304, a demodulator operating on the receiver device may receive a transport stream and may demodulate the transport stream to generate a transport stream packet associated with a program clock reference (PCR) timestamp included in the transport stream as described above with reference to FIG. 3. In other words, the demodulator may convert the analog transport stream into one or more transport stream packets, obtain a PCR timestamp from the transport stream, and associate that PCR timestamp with the one or more transport stream packets.

A transport stream interface and/or a time-stamper unit operating on the receiver device may associate media packets within the transport stream packet with a system time clock (STC) timestamp in block 703 at the time that media packets are received in block 304. As discussed above, the operation of applying an STC timestamp to media packets may be performed before, during, or after demodulation, provided the STC timestamps are applied before the media packets are stored in the transport stream buffer.

In block 704, the demodulated transport stream packets may be stored in a temporary transport stream buffer as described above with reference to FIG. 4A or 4B. A receiver device processor or another circuit may determine whether the number of stored media packets has reached a packet burst threshold value in determination block 706. In an embodiment, the packet burst threshold may correspond to one or more criteria that may indicate that a certain number of packets have been buffered (e.g., a size threshold) and/or that a certain amount of time has elapsed since the last burst of media packets were descrambled (e.g., a time threshold). For example, transport stream packets may be buffered in the transport stream buffer for a certain amount of time (e.g., a time threshold) before they are sent to the CAM in a burst. In an embodiment, the packet burst threshold may correspond to or take into account an amount of time (e.g., a time threshold) required for the USB interface to enter low-power mode. For example, the packet burst threshold may be 25 microseconds, and thus the USB interface may require 10 microseconds to enter low-power mode after sending a packet burst to the CAM in an operational mode. This example amount of time may enable the USB interface to remain in low-power mode for 15 microseconds before switching to an operational mode to send another packet burst. Thus, the packet burst threshold (e.g., the time threshold) may be set to ensure that the USB interface may remain in low-power mode for a certain amount of time or a certain percentage of the time between sending packet bursts. In a further embodiment, the packet burst threshold may be configurable and may be based at least in part on the nature of the low-power mode to which the USB interface is transitioning and the amount of time needed to transition to that low-power mode. As another example, transport stream packets may be buffered in the transport stream buffer until a certain number of packets (e.g., the size threshold) is reached before the packets are sent to the CAM in a burst.

In further embodiments, the packet burst threshold may be established by a handshake between the CAM and the receiver device, signaling received from the CAM, signaling received from the receiver device's decoder regarding the current buffer level at the decoder side, and/or numerous other criteria that may be based on the transport stream itself or on the other components operating on the receiver device and/or the CAM. For example, the packet burst threshold may be based, at least in part, on the performance of the receiver device and/or the size of the transport stream buffer included on the device. In a further embodiment, the packet burst threshold (e.g., the time threshold and/or the size threshold) may be selected to increase an amount of time that the USB interface remains in the low-power mode while providing an acceptable user experience, such as a continuous playback of a digital broadcast. In another embodiment, the packet burst threshold may be a threshold based on timestamps, such as PCR timestamps, in the packets themselves. For example, the packet burst threshold may be selected such that the packet burst threshold is reached when a discontinuity in the PCR timestamps, such as a maximum time between successive PCR timestamps being exceeded, is detected by the processor or other circuit.

In response to a processor or other circuit determining that the packet burst threshold has not been reached (i.e., determination block 706="No"), media packets may continue to be received, demodulated, time stamped, and stored in the transport stream buffer in blocks 304, 703, 704 as described above. In response to a processor or other circuit determining that the packet burst threshold has been reached (i.e., determination block 706="Yes"), a processor, or other circuit on the receiver device, may optionally configure the CAM to operate in an operational mode in optional block 707. In this optional embodiment, the CAM may be configured to operate in multiple power modes (e.g., an operational mode and one or more low-power modes similar to the receiver device 401 described above with reference to FIG. 4A), and the processor, or other circuit on the receiver device, may adjust the CAM's power mode/power usage based on the status of the receiver device's USB interface. Thus, in a further embodiment, the processor, or other circuit on the receiver device, may configure the CAM to operate in a fully-operational mode just before the receiver device's USB interface transitions to an operational mode to send packets to the CAM and may configure the CAM to return to a low-power mode when the USB interface transitions back to a low-power mode after receiving the packets back from the CAM as described below with reference to optional block 711.

In block 708, a burst of transport stream packets may be sent via the USB interface in an operational mode from the buffer to the CAM for descrambling. As described above, the USB interface may automatically enter an operational mode in response to receiving the packet burst for delivery to the CAM, such as by transitioning from a low-power mode to the operational mode. The USB interface may also automatically transition back to a low-power mode from the operational mode when there are no more packets to send to the CAM.

In another embodiment (not shown), a processor or another component on the receiver device may execute a software application to configure the USB interface to transition to the operational mode from a low-power mode controlled by software. For example, the USB interface may be in a suspend mode (e.g., a "U3" mode for USB 3.0/3.1 interfaces), and the processor may send a signal or execute a software routine to configure the USB interface to transition out of the suspend mode (i.e., to "wake up") in preparation of entering the operational mode.

Concurrently, the receiver device may set the USB interface to low-power mode in block 701 and continue to receive, demodulate, timestamp and buffer transport stream media packets in blocks 304, 702, 704 as described above. Thus, the receiver device may be receiving and buffering packets for the next packet burst while the USB interface operates in the low-power mode until the packet burst threshold is reached again (i.e., determination block 706=Yes") at which point the next packet burst is sent in block 708.

As the CAM descrambles media packets, the clock sync unit may receive the descrambled transport stream packets from the CAM via the USB input interface in block 710. In an embodiment, the USB interface may remain in an operational mode until it has sent each packet in the burst from the CAM and also received each packet back from the CAM. In other words, the USB interface may operate in an operational mode while transmitting and receiving packets. Thus, in such an embodiment, the CAM may send descrambled packets to the receiver device as fast it is able to descramble them to reduce the amount of time the receiver device's USB interface operates in an operational mode. For example, the CAM may utilize a smack buffer and may operate at high performance to minimize the amount of time required to receive, descramble, and return the packet bursts to the receiver device.

In another embodiment in which the CAM implements a transport stream buffer (e.g., transport stream buffer 416 as described with reference to FIG. 4), the CAM may delay sending descrambled packets to the receiver device, which may introduce additional delay/jitter.

In an optional embodiment, a processor or circuit on the receiver device may configure the CAM to operate in a low-power mode in optional block 711. As described above, the receiver device's USB interface may transition to a low-power mode after receiving the descrambled transport stream packets as described above regarding block 710, and receiver device processor or circuit may configure the CAM to operate in a low-power mode while the USB interface is in a low-power mode to reduce the overall power usage of both the receiver device and the CAM. For example, the processor or circuit may implement clock gating on the CAM to reduce its power while the receiver device's USB interface is operating in a low-power mode.

In block 712, the clock sync unit may adjust the time in which the descrambled transport stream packet is decoded based on the difference between the PCR timestamp and the STC stamp that was associated with the descrambled transport stream packet in blocks 304 and 702. For example, for a descrambled packet, the clock sync unit may obtain a time at which the transport stream packet is to be decoded from the receiver device's system clock and may adjust this time to synchronize the packet's decoding time with the transmitter system's decode schedule indicated in the PCR timestamp.

The decoder may decode the descrambled transport stream packet for play out based on the adjusted time in block 314 and may output the decoded transport stream packet in block 316 as described above with reference to FIG. 2. In embodiment, the decoder may also output the decoded transport stream packet based on the adjusted time calculated in block 712.

Figure 8:
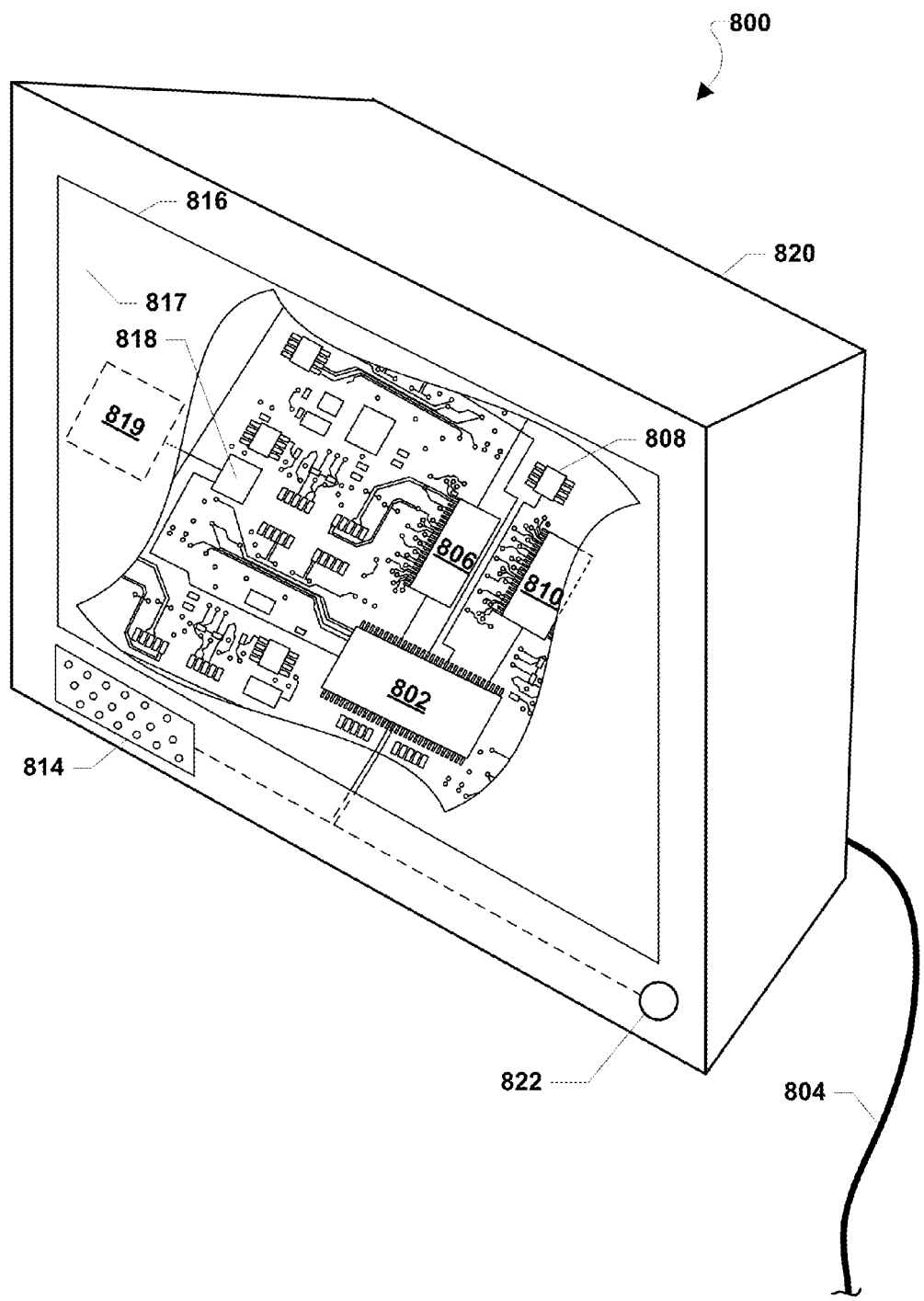
FIG. 8 is a component diagram of an example receiver device suitable for use with the various embodiments.

The various embodiments (including, but not limited to, embodiments discussed above with reference to FIGS. 4A-7B), may be implemented in any of a variety of receiver devices, an example of which is illustrated in FIG. 8. The receiver device 800 may include a processor 802 and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof. In another embodiment (not shown), the receiver device 800 may also be coupled to an external memory, such as an external hard drive.

The receiver device 800 may have one or more satellite, cable, or terrestrial tuners 808 coupled to the processor 802. The one or more tuners 808 may be used with the above-mentioned circuitry to receive and tune signals (e.g., television signals) received from a transmitter system (not shown) over a physical connection 804.

The receiver device 800 may include a peripheral device connection interface 818 coupled to the processor 802. The peripheral device connection interface 818 may be singularly configured to accept one type of connection, or may be configured to accept various types of physical and communication interfaces/connections, common or proprietary, such as USB, FireWire, Thunderbolt, or PCIe. The peripheral device connection interface 818 may also be coupled to a similarly configured peripheral device connection port (not shown), such as a connection port included on a conditional access module 819 in communication with the receiver device 800.

The receiver device 800 may also include speakers 814 for providing audio outputs. The receiver device 800 may also include a housing 820, constructed of a plastic, metal, or a combination of materials, for containing all or some of the components discussed herein. The receiver device 800 may be connected to a power source (not shown), such as a wall outlet. The receiver device 800 may also include a physical button 824 for receiving user inputs. The receiver device 800 may also include a display screen 817 coupled to the processor 802 and used for displaying visual images, such as television programs, etc.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for facilitating power management during real time playback of a digital broadcast on a receiver device comprising a communication interface, comprising:

associating a stream of media packets of the digital broadcast with system time clock (STC) timestamps indicating when the stream of media packets were received by the receiver device;

storing the stream of media packets in a temporary buffer of the receiver device;

determining whether a packet burst threshold for the temporary buffer of the receiver device has been reached, wherein the packet burst threshold is one of a time threshold and a size threshold;

configuring a conditional access module coupled to the receiver device to operate in a first operational mode other than a first low-power mode in response to determining that the packet burst threshold for the temporary buffer of the receiver device has been reached, wherein the configuring is by a signal sent from the receiver device; and sending, via the communication interface in a second operational mode other than a second low-power mode and while the conditional access device is in the first operational mode, a burst of media packets from the temporary buffer of the receiver device to the conditional access module in response to determining that the packet burst threshold for the temporary buffer of the receiver device has been reached, wherein the communication interface operates in the second low-power mode when not sending bursts of media packets.

2. The method of claim 1, wherein sending, via the communication interface in the second operational mode other than the second low-power mode and while the conditional access module is in the first operational mode, the burst of media packets from the temporary buffer of the receiver device to the conditional access module in response to determining that the packet burst threshold for the temporary buffer of the receiver device has been reached comprises sending over a transport stream, via the communication interface in a first high-power mode and while the conditional access module is in a second high-power mode, the burst of media packets from the temporary buffer of the receiver device to the conditional access module in response to determining that the packet burst threshold for the temporary buffer of the receiver device has been reached.

3. The method of claim 2, wherein the transport stream is a timed MPEG2 transport stream.

4. The method of claim 1, wherein determining whether the packet burst threshold for the temporary buffer of the receiver device has been reached comprises determining whether the packet burst threshold for the temporary buffer of the receiver device has been reached based on at least one of signaling from the conditional access module and signaling from a decoder operating on the receiver device.

5. The method of claim 1, further comprising:

receiving a descrambled transport stream packet from the conditional access module via the communication interface;

adjusting a time at which the descrambled transport stream packet is decoded based on a difference between a program clock reference (PCR) timestamp associated with the media packets by a transmitter and the STC timestamps indicating when the stream of media packets were received by the receiver device;

decoding the descrambled transport stream packet for play out based on the adjusted time; and outputting the decoded transport stream packet.

6. The method of claim 5, further comprising configuring the conditional access module to operate in the first low-power mode after receiving the descrambled transport stream packet.

7. The method of claim 1, wherein the communication interface is one of a Universal Serial Bus (USB) 2.0 interface, a USB 3.0 interface, a USB 3.1 interface, a Peripheral Component Interconnect Express (PCIe) interface, a High-Speed, Inter-Chip (HSIC) interface, or a Super-Speed, Inter-Chip (SSIC) interface.

8. A receiver device, comprising:
a communication interface;
a temporary buffer connected to the communication interface; and
a processor connected to the communication interface and temporary buffer, wherein the processor is configured with processor executable instructions to perform operations comprising:

associating a stream of media packets of a digital broadcast with system time clock (STC) timestamps indicating when the stream of media packets were received by the receiver device;

storing the stream of media packets in the temporary buffer of the receiver device;

determining whether a packet burst threshold for the temporary buffer of the receiver device has been reached, wherein the packet burst threshold is one of a time threshold and a size threshold;

configuring a conditional access module coupled to the receiver device to operate in a first operational mode other than a first low-power mode in response to determining that the packet burst threshold for the temporary buffer of the receiver device has been reached, wherein the configuring is by a signal sent from the receiver device; and sending, via the communication interface in a second operational mode other than a second low-power mode and while the conditional access module is in the first operational mode, the burst of media packets from the temporary buffer of the receiver device to the conditional access module in response to determining that the packet burst threshold for the temporary buffer has been reached, wherein the communication interface operates in a second low-power mode when not sending bursts of media packets.

9. The receiver device of claim 8, wherein the processor is configured with processor executable instructions to perform operations such that sending, via the communication interface in the second operational mode other than the second low-power mode and while the conditional access module is in the first operational mode, the burst of media packets from the temporary buffer of the receiver device to the conditional access module in response to determining that the packet burst threshold for the temporary buffer of the receiver device has been reached comprises sending over a transport stream, via the communication interface in a first high-power mode and while the conditional access module is in a second high-power mode, the burst of media packets from the temporary buffer of the receiver device to the conditional access module in response to determining that the packet burst threshold for the temporary buffer of the receiver device has been reached.

10. The receiver device of claim 9, wherein the transport stream is a timed MPEG2 transport stream.

11. The receiver device of claim 8, wherein the processor is configured with processor executable instructions to perform operations such that determining whether the packet burst threshold for the temporary buffer of the receiver device has been reached comprises determining whether the packet burst threshold has been reached based on at least one of signaling from the conditional access module and signaling from a decoder operating on the receiver device.

12. The receiver device of claim 8, wherein the processor is configured with processor executable instructions to perform operations further comprising:

receiving a descrambled transport stream packet from the conditional access module via the communication interface;

adjusting a time at which the descrambled transport stream packet is decoded based on a difference between a program clock reference (PCR) timestamp associated with the media packets by a transmitter and the STC timestamps indicating when the stream of media packets were received by the receiver device;
decoding the descrambled transport stream packet for play out based on the adjusted time; and
outputting the decoded transport stream packet.

13. The receiver device of claim 12, wherein the processor is configured with processor executable instructions to perform operations further comprising configuring the conditional access module to operate in the first low-power mode after receiving the descrambled transport stream packet.

14. The receiver device of claim 8, wherein the communication interface is one of a Universal Serial Bus (USB) 2.0 interface, a USB 3.0 interface, a USB 3.1 interface, a Peripheral Component Interconnect Express (PCIe) interface, a High-Speed, Inter-Chip (HSIC) interface, or a SuperSpeed, Inter-Chip (SSIC) interface.

15. A non-transitory processor-readable storage medium having stored thereon processor-executable instructions configured to cause a processor of a receiver device to perform operations comprising:
associating a stream of media packets of a digital broadcast with system time clock (STC) timestamps indicating when the stream of media packets were received by the receiver device;
storing the stream of media packets in a temporary buffer of the receiver device;
determining whether a packet burst threshold for the temporary buffer of the receiver device has been reached, wherein the packet burst threshold is one of a time threshold and a size threshold;
configuring a conditional access module coupled to the receiver device to operate in a first operational mode other than a first low-power mode in response to determining that the packet burst threshold for the temporary buffer of the receiver device has been reached, wherein the configuring is by a signal sent from the receiver device; and
sending, via the communication interface in a second operational mode other than a second low-power mode and while the conditional access module is in the first operational mode, the burst of media packets from the temporary buffer of the receiver device to the conditional access module in response to determining that the packet burst threshold for the temporary buffer of the receiver device has been reached,
wherein the communication interface operates in the second low-power mode when not sending bursts of media packets.

16. The non-transitory processor-readable storage medium of claim 15, wherein the stored processor-executable instructions are configured to cause the processor of the receiver device to perform operations such that sending, via the communication interface in the second operational mode other than the second low-power mode and while the conditional access module is in the first operational mode, the burst of media packets from the temporary buffer of the receiver device to the conditional access module in response to determining that the packet burst threshold for the temporary buffer of the receiver device has been reached comprises sending over a transport stream, via the communication interface in a first high-power mode and while the conditional access module is in a second high-power mode, the burst of media packets from the temporary buffer of the receiver device to the conditional access module in response to determining that the packet burst threshold for the temporary buffer of the receiver device has been reached.

17. The non-transitory processor-readable storage medium of claim 16, wherein the stored processor-executable instructions are configured to cause the processor of the receiver device to perform operations such that the transport stream is a timed MPEG2 transport stream.

18. The non-transitory processor-readable storage medium of claim 15, wherein the stored processor-executable instructions are configured to cause the processor of the receiver device to perform operations such that determining whether the packet burst threshold for the temporary buffer of the receiver device has been reached comprises determining whether the packet burst threshold for the temporary buffer of the receiver device has been reached based on at least one of signaling from the conditional access module and signaling from a decoder operating on the receiver device.

19. The non-transitory processor-readable storage medium of claim 15, wherein the stored processor-executable instructions are configured to cause the processor of the receiver device to perform operations further comprising:
receiving a descrambled transport stream packet from the conditional access module via the communication interface;
adjusting a time at which the descrambled transport stream packet is decoded based on a difference between a program clock reference (PCR) timestamp associated with the media packets by a transmitter and the STC timestamps indicating when the stream of media packets were received by the receiver device;
decoding the descrambled transport stream packet for play out based on the adjusted time; and
outputting the decoded transport stream packet.

20. The non-transitory processor-readable storage medium of claim 19, wherein the stored processor-executable instructions are configured to cause the processor of the receiver device to perform operations further comprising configuring the conditional access module to operate in the first low-power mode after receiving the descrambled transport stream packet.

21. The non-transitory processor-readable storage medium of claim 15, wherein the stored processor-executable instructions are configured to cause the processor of the receiver device to perform operations such that the communication interface is one of a Universal Serial Bus (USB) 2.0 interface, a USB 3.0 interface, a USB 3.1 interface, a Peripheral Component Interconnect Express (PCIe) interface, a High-Speed, Inter-Chip (HSIC) interface, or a SuperSpeed, Inter-Chip (SSIC) interface.

22. A receiver device, comprising:
a communication interface;
a temporary buffer connected to the communication interface;
means for associating a stream of media packets of a digital broadcast with system time clock (STC) timestamps indicating when the stream of media packets were received by the receiver device;
means for storing the stream of media packets in the temporary buffer of the receiver device;
means for determining whether a packet burst threshold for the temporary buffer of the receiver device has been reached, wherein the packet burst threshold is one of a time threshold and a size threshold;
means for configuring a conditional access module coupled to the receiver device to operate in a first operational mode other than a first low-power mode in response to determining that the packet burst threshold for the temporary buffer of the receiver device has been reached, wherein the configuring is by a signal sent from the receiver device; and means for sending, via the communication interface in a second operational mode other than a second low-power mode and while the conditional access module is in the first operational mode, the burst of media packets from the temporary buffer of the receiver device to the conditional access module in response to determining that the packet burst threshold for the temporary buffer of the receiver device has been reached, wherein the communication interface operates in the second low-power mode when not sending bursts of media packets.

23. The receiver device of claim 22, wherein means for sending, via the communication interface in the second operational mode other than the second low-power mode and while the conditional access module is in the first operational mode, the burst of media packets from the temporary buffer of the receiver device to the conditional access module in response to determining that the packet burst threshold for the temporary buffer has been reached comprises means for sending over a transport stream, via the communication interface in a first high-power mode and while the conditional access module is in a second high power mode, the burst of media packets from the temporary buffer of the receiver device to the conditional access module in response to determining that the packet burst threshold for the temporary buffer of the receiver device has been reached.

24. The receiver device of claim 23, wherein the transport stream is a timed MPEG2 transport stream.

25. The receiver device of claim 22, wherein means for determining whether the packet burst threshold for the temporary buffer of the receiver device has been reached comprises means for determining whether the packet burst threshold for the temporary buffer of the receiver device has been reached based on at least one of signaling from the conditional access module and signaling from a decoder operating on the receiver device.

26. The receiver device of claim 22, wherein the communication interface is one of a Universal Serial Bus (USB) 2.0 interface, a USB 3.0 interface, a USB 3.1 interface, a Peripheral Component Interconnect Express (PCIe) interface, a High-Speed, Inter-Chip (HSIC) interface, or a Super-Speed, Inter-Chip (SSIC) interface.

* * * * *